US008382577B2

(12) United States Patent
Teranishi et al.

(10) Patent No.: US 8,382,577 B2
(45) Date of Patent: Feb. 26, 2013

(54) GAMING MACHINE

(75) Inventors: Tatsuya Teranishi, Koto-ku (JP); Masumi Fujisawa, Koto-ku (JP); Masahiro Yoshida, Koto-ku (JP); Masahiko Konishi, Koto-ku (JP); Yuka Hotta, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 79 days.

(21) Appl. No.: 13/075,926

(22) Filed: Mar. 30, 2011

(65) Prior Publication Data

US 2011/0177861 A1 Jul. 21, 2011

Related U.S. Application Data

(63) Continuation of application No. 12/791,559, filed on Jun. 1, 2010.

(30) Foreign Application Priority Data

Jun. 1, 2009 (JP) ................................ 2009-132578

(51) Int. Cl.
*G06F 17/00* (2006.01)

(52) U.S. Cl. ........................................ 463/20; 463/16

(58) Field of Classification Search ............... 463/16–20
See application file for complete search history.

(56) References Cited

U.S. PATENT DOCUMENTS

| | | | | |
|---|---|---|---|---|
| 6,935,947 | B1 * | 8/2005 | Singer et al. | 463/16 |
| 7,258,611 | B2 | 8/2007 | Bigelow, Jr. et al. | |
| 7,278,919 | B2 | 10/2007 | Souza et al. | |
| 7,568,973 | B2 * | 8/2009 | Iddings et al. | 463/25 |
| 7,785,190 | B2 | 8/2010 | Aida | |
| 8,029,354 | B2 * | 10/2011 | Saito | 463/20 |
| 8,047,910 | B2 * | 11/2011 | Isaac et al. | 463/20 |
| 8,162,733 | B2 * | 4/2012 | Yoshizawa | 463/10 |
| 2007/0021178 | A1 | 1/2007 | Kobayashi | |
| 2007/0293299 | A1 | 12/2007 | Aida | |
| 2008/0064487 | A1 * | 3/2008 | Stevens et al. | 463/25 |
| 2008/0146330 | A1 | 6/2008 | Yoshizawa | |
| 2009/0227339 | A1 * | 9/2009 | Kim | 463/20 |
| 2010/0048281 | A1 * | 2/2010 | Kearns et al. | 463/20 |
| 2010/0048286 | A1 * | 2/2010 | Okada et al. | 463/20 |
| 2010/0087243 | A1 * | 4/2010 | Saito et al. | 463/20 |

FOREIGN PATENT DOCUMENTS

| | | | | |
|---|---|---|---|---|
| CN | 1899653 | A | | 1/2007 |
| CN | 101206781 | A | | 6/2008 |
| JP | 2005065747 | A | * | 3/2005 |

OTHER PUBLICATIONS

Macanese Office Action issued Jun. 30, 2011, in Patent Application No. I/001045(600) (with English-language translation).

* cited by examiner

*Primary Examiner* — Michael Cuff

(74) *Attorney, Agent, or Firm* — Lexyoume IP Meister, PLLC.

(57) ABSTRACT

A gaming machine according to the present invention variably displays a plurality of symbols wherein a speed of the variable display of the plurality of symbols while executing a free game is different from a speed of variable display of the plurality of symbols while executing a basic game. In this manner, it is possible to impart a sense of expectation for free game to a player without separately preparing any effect video image such as a video image showing a process of adding WILD symbols.

3 Claims, 31 Drawing Sheets

3a 3b 3c 3d 3e

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

FIG. 18A

| Number of games played | Scroll speed (number of frames) |
|---|---|
| 0 | 48 |
| 1 | 54.6 |
| 2 | 61.2 |
| 3 | 67.8 |
| 4 | 74.4 |
| 5 | 81 |
| 6 | 87.6 |
| 7 | 94.2 |
| 8 | 100.8 |
| 9 | 107.4 |
| 10 | 114 |

FIG. 18B

| | Ordinary | | Slow | |
|---|---|---|---|---|
| | SYMBOL | FRAME | SYMBOL | FRAME |
| REEL1 | 12 | 48 | 19 | 114 |
| REEL2 | 19 | 76 | 26 | 156 |
| REEL3 | 26 | 104 | 33 | 198 |
| REEL4 | 33 | 132 | 40 | 240 |
| REEL5 | 40 | 160 | 47 | 282 |

FIG. 20

* Symbol arrangement is provided as a mere imaginary view.

| | REEL1 | REEL2 | REEL3 | REEL4 | REEL5 |
|---|---|---|---|---|---|
| No.1 | | | | | |
| No.2 | | | | | Q |
| No.3 | | | | | K |
| No.4 | | | | | Q |
| No.5 | | | | | J |
| No.6 | | | | | A |
| No.7 | | | | | K |
| No.8 | | | | | Q |
| No.9 | | | | K | K |
| No.10 | | | | Q | Q |
| No.11 | | | | J | J |
| No.12 | | | | A | A |
| No.13 | | | | K | K |
| No.14 | | | | Q | Q |
| No.15 | | | | K | K |
| No.16 | | | Q | Q | Q |
| No.17 | | | J | J | J |
| No.18 | | | A | A | A |
| No.19 | | | K | K | K |
| No.20 | | | Q | Q | Q |
| No.21 | | | K | K | K |
| No.22 | | | Q | Q | Q |
| No.23 | | J | J | J | J |
| No.24 | | A | A | A | A |
| No.25 | | K | K | K | K |
| No.26 | | Q | Q | Q | Q |
| No.27 | | K | K | K | K |
| No.28 | | Q | Q | Q | Q |
| No.29 | | J | J | J | J |
| No.30 | A | A | A | A | A |
| No.31 | K | K | K | K | K |
| No.32 | Q | Q | Q | Q | Q |
| No.33 | K | K | K | K | K |
| No.34 | Q | Q | Q | Q | Q |
| No.35 | J | J | J | J | J |
| No.36 | A | A | A | A | A |
| No.37 | K | K | K | K | K |
| No.38 | J | J | J | J | J |
| No.39 | A | A | A | A | A |
| No.40 | Q | Q | Q | Q | Q |
| ~ | | | | | |
| No.41 | | WILD | WILD | WILD | WILD |
| No.42 | | WILD | WILD | WILD | WILD |
| No.43 | | WILD | WILD | WILD | WILD |
| No.44 | | WILD | WILD | WILD | WILD |
| No.45 | | WILD | WILD | WILD | WILD |
| No.46 | | WILD | WILD | WILD | WILD |
| No.47 | | WILD | WILD | WILD | WILD |
| No.48 | | WILD | WILD | WILD | WILD |
| No.49 | | WILD | WILD | WILD | WILD |
| No.50 | | WILD | WILD | WILD | WILD |
| No.51 | Q | Q | Q | Q | Q |
| No.52 | J | J | J | J | J |

Up to 10 symbols are visible.

FIG. 27

| | Normal 1 | Bonus 2 | SP Bonus3 | Normal 3 | SP Bonus3 | Bonus 4 | SP Bonus4 | Normal 5 | SP Bonus5 |
|---|---|---|---|---|---|---|---|---|---|
| No.1 | A | A | Q | A | Q | A | Q | A | Q |
| No.2 | K | K | J | K | J | K | WILD | K | J |
| No.3 | Q | Q | A | Q | A | Q | WILD | Q | A |
| No.4 | J | J | K | J | K | WILD | WILD | J | K |
| No.5 | WILD | A | Q | A | WILD | A | WILD | A | Q |
| No.6 | K | K | J | K | WILD | K | WILD | K | WILD |
| No.7 | Q | Q | WILD | WILD | WILD | Q | WILD | Q | WILD |
| No.8 | J | J | WILD | J | WILD | J | WILD | WILD | WILD |
| No.9 | A | WILD | WILD | A | WILD | A | A | A | WILD |
| No.10 | K | K | WILD | K | WILD | K | K | K | WILD |
| No.11 | Q | Q | WILD | Q | J | Q | Q | Q | WILD |
| No.12 | J | J | K | J | A | J | J | J | A |
| No.13 | A | A | Q | A | K | A | A | A | K |
| ~ | | | | | | | | | |
| No.98 | Q | Q | A | Q | J | Q | Q | Q | J |
| No.99 | J | J | K | J | A | J | J | J | A |

* Up to 10 symbols are visible. (No.2 to No.11)

* Symbol arrangement are provided as a mere imaginary view.

FIG. 28

(EFFECT IMAGE)

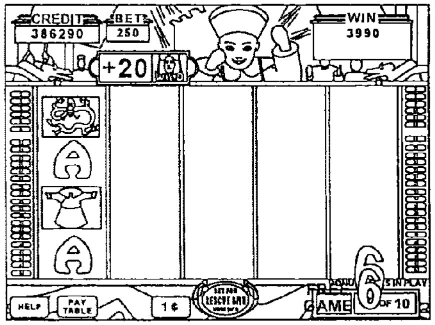

I
SECOND TO FOURTH REELS FLASH, AND THEN, THE REELS ARE REDISPLAYED FROM BEHIND AT WILD INSERTION POSITIONS.

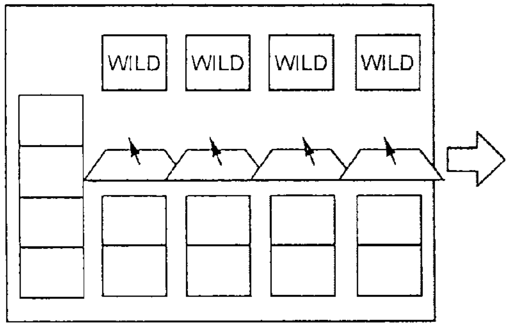

II
AFTER THE FLASHING, WILD SYMBOLS ARE INSERTERD INTO THE SECOND SEGMENTS OF THE SECOND TO FOURTH REELS ON ONE-BY-ONE BASIS.

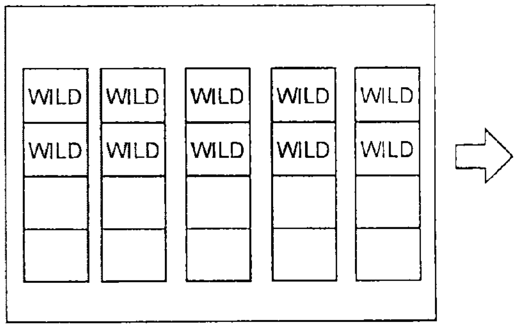

III
INSERTION COMPLETED

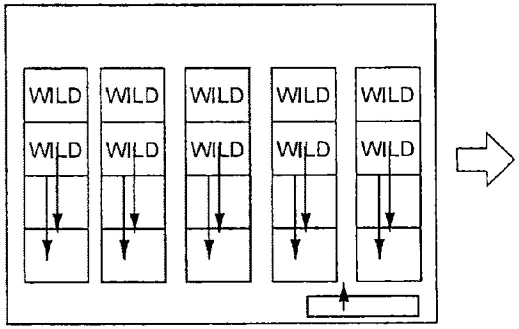

IV
AFTER WILD INSERTION, EACH REEL STARTS SPINNING. AT THIS TIME, LOWER RIGHT COUNTER IS ALLOWED TO COUNT UP BY 1 SIMULTANCOUSLY, AND SOUNDS ARE OUTPUT. UP TO 10 SYMBOLS INCLUDING INSERTED SYMBOLS ARE NOT REDISPLAYED, AND THE REELS ARE REDISPLAYED FOR UP TO A POSITION COUNTED BACK FROM THE 11th STOPPED POSITION.

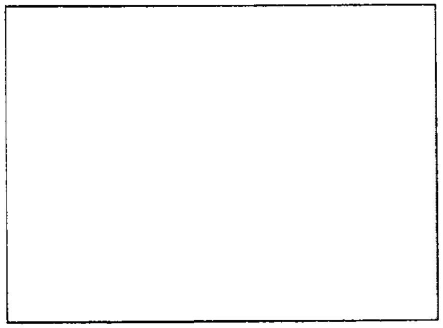

V
SUBSEQUENTLY, THIS OPERATION IS REPEATED FOR EACH GAME.

GAMING MACHINE

CROSS-REFERENCE TO RELATED APPLICATIONS

This application is a continuation of U.S. application Ser. No. 12/791,559, filed Jun. 1, 2010, and is based on and claims a priority from the prior Japanese patent Application No. 2009-132578, filed on Jun. 1, 2009, the entire contents of both of which are incorporated herein by reference.

BACKGROUND OF THE INVENTION

1. Field of the Invention

The present invention relates to a gaming machine adapted to play a game in which a plurality of symbols including WILD symbols is to be rearranged.

2. Description of the Related Art

Conventionally, a gaming machine adapted to award a free game as a bonus game is known. (Refer to U.S. Pat. No. 7,258,611, for example.) In a reel game of the conventional gaming machine, the number of free games provided when an event has occurred is determined by a player's selection. A free game is randomly determined or is determined according to the player's betting. Further, the number of free spins in the conventional gaming machine will increase when a predetermined condition is met. At another conventional gaming machine, there is disclosure of providing plural sets of free games (refer to U.S. Pat. No. 7,278,919, for example). There has also been proposed an idea of adding WILD symbols while in a free game in order to enhance a sense of expectation for free game more.

As described above, the idea of adding the WILD symbols while in the free game has been proposed so far. An object of adding the WILD symbols is to impart the sense of expectation to the player. However, even if WILD symbols are added to reels, in the case where the player is not notified of the number of added WILD symbols, the player could not recognize the fact that the WILD symbol has been added. Therefore, this could not produce a full effect of imparting the sense of expectation to a player. For example, in the cases where three or five WILD symbols have been added, even if the player observes scrolling reels, a difference therebetween could not be recognized. In order to solve this problem, it is possible to display to the player a video image showing a process of adding one or more WILD symbols. However, in the case of such an arrangement, a video image showing a process of adding the WILD symbols must be previously prepared.

SUMMARY OF THE INVENTION

The present invention has been made in view of the above-described circumference and aims to provide a gaming machine which is capable of imparting a sense of expectation for free game to a player without separately preparing any effect video image such as a video image showing a process of adding one or more WILD symbols.

In an aspect of the present invention, a gaming machine includes: a symbol display device which is capable of variably displaying a plurality of symbols; and a controller which is programmed to execute processing of the following (A) to (C): (A) executing a basic game in which gaming media are betted, the plurality of symbols are stop-displayed after variably displayed in the symbol display device, and then, gaming media whose amount corresponds to the stop-displayed symbols or a combination thereof are paid out; (B) executing a free game in which no gaming media are betted, the plurality of symbols are stop-displayed after variably displayed in the symbol display device, and then, gaming media whose amount corresponds to the stop-displayed symbols or a combination thereof are paid out; and (C) variably displaying the plurality of symbols in which a speed of the plurality of symbols while executing the free game is different from a speed of the variable display of the plurality of symbols while executing the basic game.

According to the aspect of the present invention, symbols can be variably displayed so that a speed of the variable display of the plurality of symbols while the gaming machine executes a free game is different from a speed of the variable display of the plurality of symbols while the gaming machine executes a basic game. Therefore, a sense of expectation for free game can be imparted to a player.

BRIEF DESCRIPTION OF THE DRAWINGS

FIG. 5 illustrates a symbol table for a basic game.

FIG. 7 illustrates a table showing symbol combinations for the gaming machine according to the embodiment of the present invention.

FIGS. 18A and 18B illustrate: one speed determination table storing a correlation between the number of games played and a scroll speed for the gaming machine according to the embodiment of the present invention; and the other table showing an example of an ordinary scroll speed and a slowdown scroll speed (slow) as to five video reels, respectively.

FIG. 20 illustrates a table showing a symbol array of each of the five video reels 3*a*, 3*b*, 3*c*, 3*d*, and 3*e* for the gaming machine according to the embodiment of the present invention.

FIGS. 21A, 21B-1, 21B-2, 21B-3, 21C-1, 21C-2, and 21C-3 are images respectively displayed when the gaming machine according to the embodiment of the present invention produces an effect called li-zhi by a well-aimed hit from the spin button.

FIGS. 22A-1, 22A-2, 22B-1, and 22B-2 are images respectively displayed when the gaming machine according to the embodiment of the present invention produces an effect called emperor effect 1.

FIGS. 23A-1, 23A-2, 23B-1, and 23B-2 are images respectively displayed when the gaming machine according to the embodiment of the present invention produces an effect called emperor effect 2.

FIG. 27 illustrates a table showing an example of layout when WILD symbols have been increased for each of the five video reels for the gaming machine according to the embodiment of the present invention.

FIG. 28 shows an image displayed in a course of increasing the number of WILD symbols for the gaming machine according to the embodiment of the present invention.

DESCRIPTION OF THE PREFERRED EMBODIMENTS

Hereinafter, exemplary embodiments of the present invention will be described with reference to the drawings.

Figure 1:
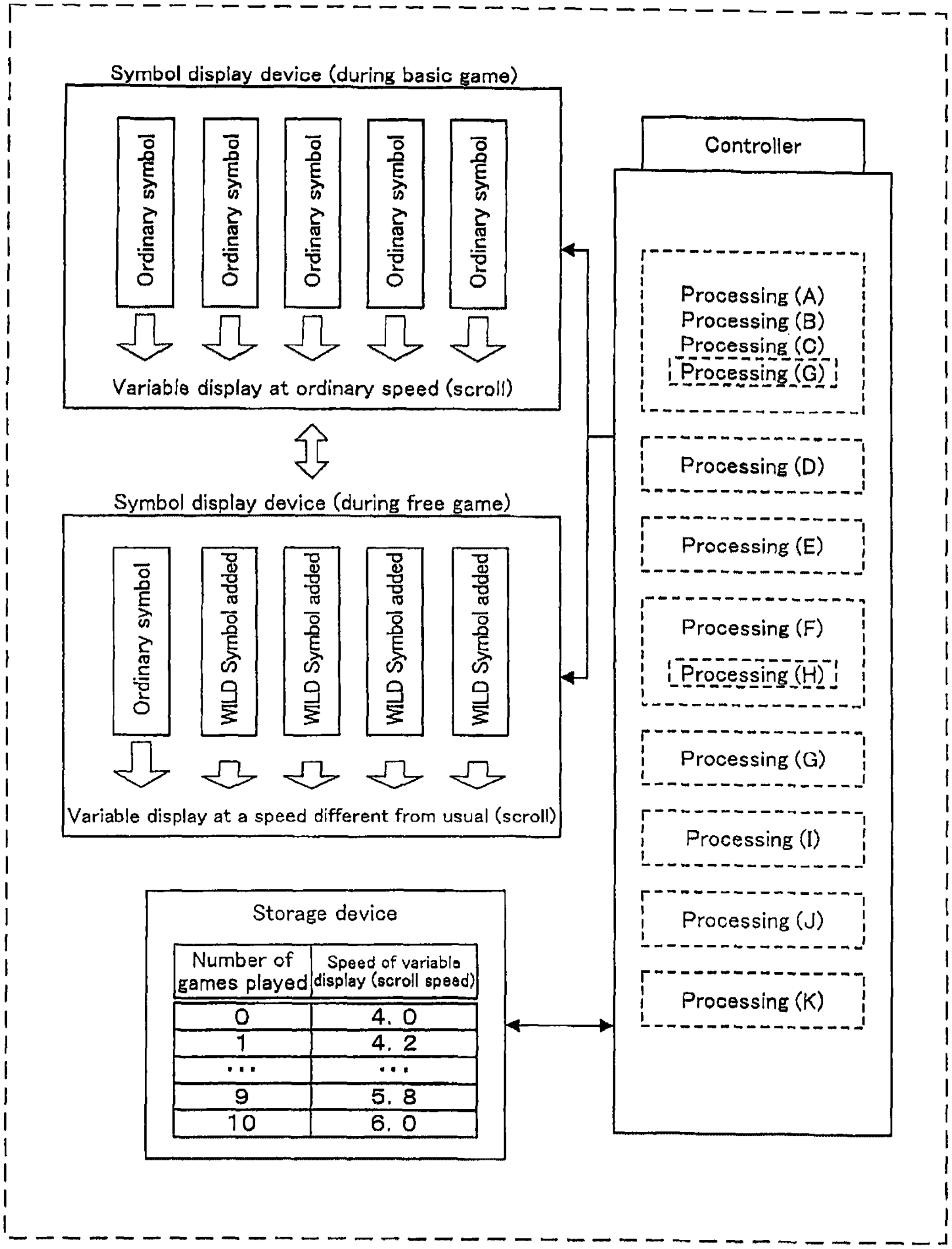
FIG. 1 is a schematic view showing a gaming machine according to an embodiment of the present invention.

FIG. 1 is a schematic view showing a gaming machine according to an embodiment of the present invention.

The gaming machine according to the embodiment of the present invention has a symbol display device and a controller. The symbol display device allows a plurality of symbols to be variably displayed thereon. The controller is programmed to execute the processing of (A) to (C) that follows.

The processing (A) is a step for executing a basic game, wherein gaming media are betted, and the controller executes the stop-display after variably displaying the plurality of symbols in the symbol display device, and then paying gaming media whose amount corresponds to the stop-displayed symbols or a combination thereof. The processing in steps S12 to S24 of FIG. 8, to be described later, is equivalent to the processing (A).

The processing (A) is the step for a basic game. A basic game is started on the condition that a gaming medium has been bet. That is, the processing (A) is the one to be executed on the condition that a gaming medium has been bet.

In the processing (A), the symbol display device variably displays a plurality of symbols. Afterwards, the plurality of these variably displayed symbols is stop-displayed. The plurality of the symbols are rearranged by way of stop-display of the plurality of the symbols. An amount of gaming media is predetermined in association with predetermined symbols stop-displayed or a predetermined symbol combination formed by the plurality of stop-displayed symbols. Therefore, when stop-displayed symbols or a symbol combination are/is the predetermined one(s), the gaming media in the predetermined amount are paid out.

The processing (B) is a step for executing a free game, wherein without gaming media betted, the controller executes the stop-display after variably displaying the plurality of symbols on the symbol display device, and then paying gaming media whose amount corresponds to the stop-displayed symbols or a combination thereof. The processing in steps S191 to S203 of FIG. 16, to be described later, is equivalent to the processing (B).

The processing (B) is the step for free game. A free game is started on the condition that no gaming media have been betted. That is, the processing (B) is the one to be executed on the condition that no gaming media have been betted.

In the processing (B) also, the symbol display device variably displays a plurality of symbols in the symbol display device, and thereafter stop-displays the plurality of these symbols. Afterwards, like a basic game, when the stop-displayed symbols or a combination thereof are/is the predetermined one(s), the gaming media for the predetermined amount are paid out.

The processing (C) is a step of executing the variable display wherein the speed of the variable display of a plurality of symbols during the play of the free game is different from that of variable display of a plurality of symbols during the play of the basic game. The processing in step S1843 of FIG. 17, to be described later, is equivalent to the processing (C).

The symbol "scroll-display" to be described later is equivalent to the symbol "variable display". With this configuration, symbols are variably displayed wherein the speed of the variable display of a plurality of symbols during the play of the free game is different from that of variable display of a plurality of symbols during the play of the basic game. Therefore, a player can recognize that the symbol movement speed is different from usual, so that a sense of expectation for free game can be imparted to a player.

In addition, it is preferable that the gaming machine according to the embodiment of the present invention has the following constituent elements.

In the above-described gaming machine, the controller executes processing of (D), including, in the plurality of symbols, WILD symbols which are capable of forming a winning combination in an "almighty" manner while executing the free game. The processing in steps S1821 to 1841 of FIG. 17, to be described later, is equivalent to the processing of (D).

With such a configuration, when a free game is executed, WILD symbols are displayed after included in a plurality of symbols, so that a sense of expectation for free game can be further imparted to a player.

When a basic game is executed, ordinary symbols are displayed (see FIG. 1); and when a free game is executed, WILD symbols are additionally displayed (see FIG. 1). Namely, when a free game is executed, WILD symbols may be newly added and displayed. That is, a predetermined number of WILD symbols may be already included in the ordinary symbols displayed during the play of basic game. When a free game is executed, WILD symbols may be more increased and displayed than those in basic game.

Further, it is preferable that the gaming machine according to the embodiment of the present invention has storage means for storing a correlation between the number of games played and the speed of the variable display associated with the number of games played. In this case, it is preferable that the abovementioned controller executes processing (E) that follows. A ROM 72 to be described later is equivalent to "storage means." An interrelationship between the number of games played and the scroll speed, shown in the table of FIG. 18A, is equivalent to a "correlation."

The processing (E) is a step of starting counting the number of free games played, at a predetermined time while a free game is executed; referring to a correlation stored in storage means by employing the number of games counted; and determining the speed of the variable display. The processing in step S1843 of FIG. 17, to be described later, is equivalent to the processing (E).

With such a configuration, the speed of the variable display of a plurality of symbols can be determined according to the number of free games played, and a sense of expectation for free game can be imparted to a player without separately preparing any effect video image such as a video image showing a process of adding WILD symbols.

Furthermore, it is preferable that a controller of the gaming machine according to the embodiment of the present invention executes processing (F) that follows. The processing (F) is a step of adding WILD symbols to the plurality of symbols at a predetermined time and variably displaying the plurality of symbols while executing a free game.

With such a configuration, when a free game is played, a plurality of symbols can be variably displayed with WILD symbols being added thereto, and a sense of expectation for free game can be imparted to a player. Further, the speed of the variable display when WILD symbols are added can be determined by executing the processing (F) and the above-described processing (E), so that a sense of expectation for free game can be imparted to a player without separately preparing any effect video image such as a video image showing a process of adding WILD symbols.

Further, it is preferable that the above-described processing (C) comprises processing (G) that follows. The processing (G) is a step of allowing the speed of the variable display during the play of free game to be slower than that of the variable display during the play of basic game.

The speed of the variable display is reduced so that, even while symbols are variably displayed, a player can clearly visually recognize the fact that WILD symbols have been added. Thus, by way of addition of the WILD symbols, there arises a high possibility that a result of a free game favorable to a player can be obtained, and a sense of expectation for a free game can be imparted to a player.

Further, it is preferable that the above-described processing (F) executes processing (H) that follows. The processing (H) is a step of starting an effect by displaying a predetermined animation character, at a predetermined time in the processing (F).

Displaying the animation character allows a player to clearly notify the fact that WILD symbols have been added. This can impart a sense of expectation for free game to the player without separately preparing any effect video image such as a video image showing a process of adding WILD symbols.

Furthermore, it is preferable that the above-described processing (E) executes processing (I) that follows. The processing (I) is a step of starting counting of the number of free games played at a predetermined time while a free game is played, and thereafter, increasing the number of WILD symbols to be added and reducing the speed of the variable display, as the number of games counted increases. This is equivalent to the processing in steps S1821 to S1827 of FIG. 17, to be described later, and an interrelationship between the number of games played and a scroll speed, shown in the table of FIG. 18A.

With an increased number of WILD symbols, there arises a high possibility that a result of free game favorable to a player can be obtained, and a sense of further expectation for free game can be imparted to a player by allowing the player to visually recognize the increased number of WILD symbols.

Furthermore, it is preferable that the controller of the gaming machine according to the embodiment of the present invention executes processing (J) that follows. The processing (J) is a step of determining a time interval between the start of the variable display and the stop-display of symbols in accordance with the speed of the variable display.

Furthermore, it is preferable that the controller of the gaming machine according to the embodiment of the present invention executes processing (K) that follows. The processing (K) is a step of determining a time interval between the start of the variable display and the stop-display of symbols in accordance with the number of WILD symbols.

In the case where the number of WILD symbols is small, there arises a low possibility that a result favorable to a player can be obtained. In such a case, however, symbols may be stopped within a short period of time from the start of variable display. Even in the case where the number of WILD symbols is small, as long as such WILD symbols exist, a possibility that a result favorable to a player can be obtained becomes higher than that in the case where no WILD symbol exists. Therefore, while the WILD symbols exist, reducing the duration of the variable display makes it possible to impart to a player an opportunity of playing more games and to improve the rate of operation of gaming machines.

[Explanation of Function Flow Diagram]

Figure 2:
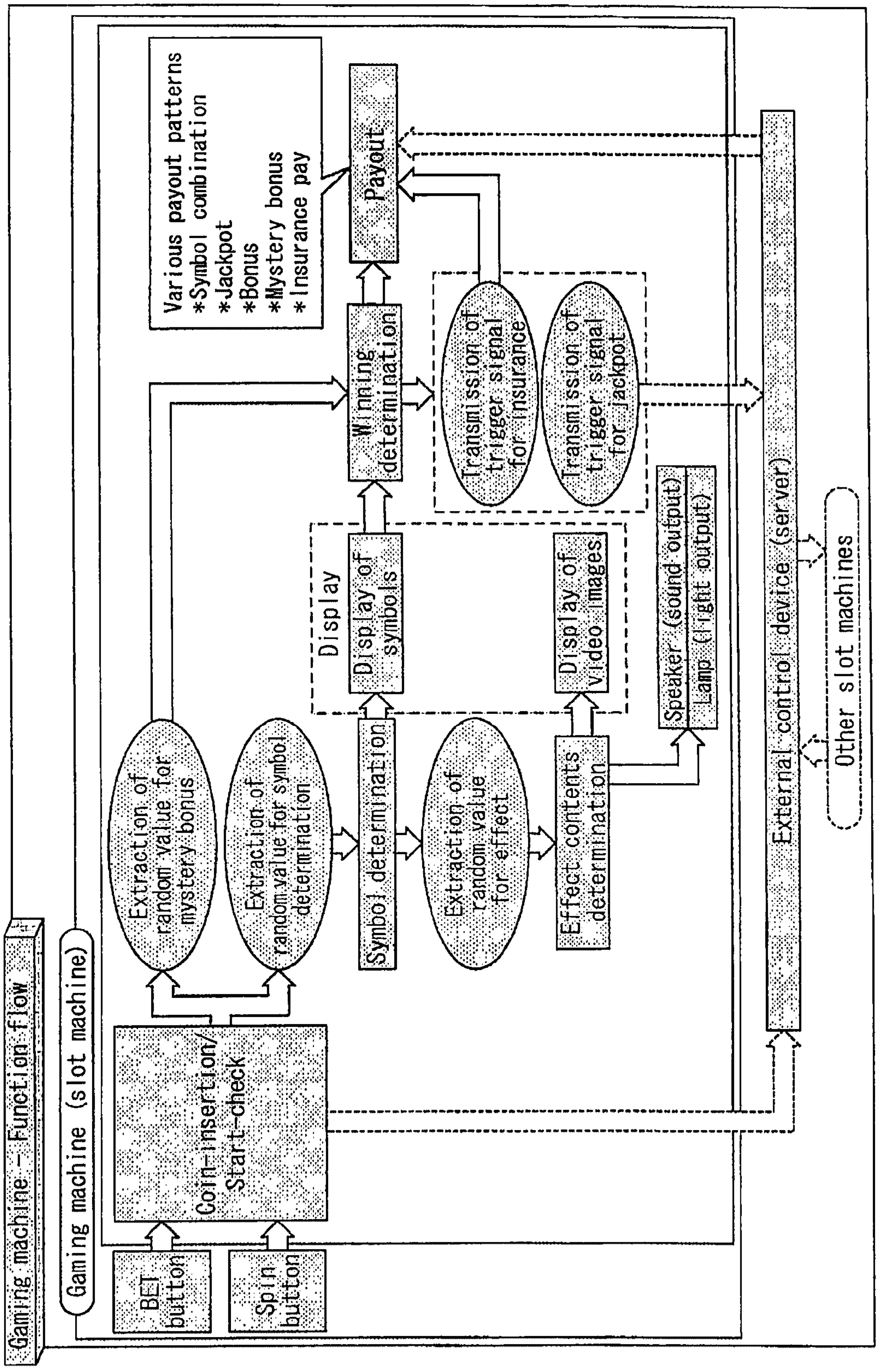
FIG. 2 is a view illustrating a function flow of the gaming machine according to the embodiment of the present invention.

With reference to FIG. 2, basic functions of the gaming machine according to the present embodiment are described.

FIG. 2 is a view illustrating a function flow of the gaming machine according to the embodiment of the present invention.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

In addition, the gaming machine starts a bonus game when a combination of symbols according to a bonus game trigger has been displayed. In the embodiment, a game (free game) is played as a bonus game in which the lottery according to determination of symbols to be stopped, described previously, is performed without consuming any coin.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a bonus game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a bonus game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

The basic functions of the gaming machine have been described above. Next, with reference to FIG. 3, a game system including the gaming machine is described.

Figure 3:
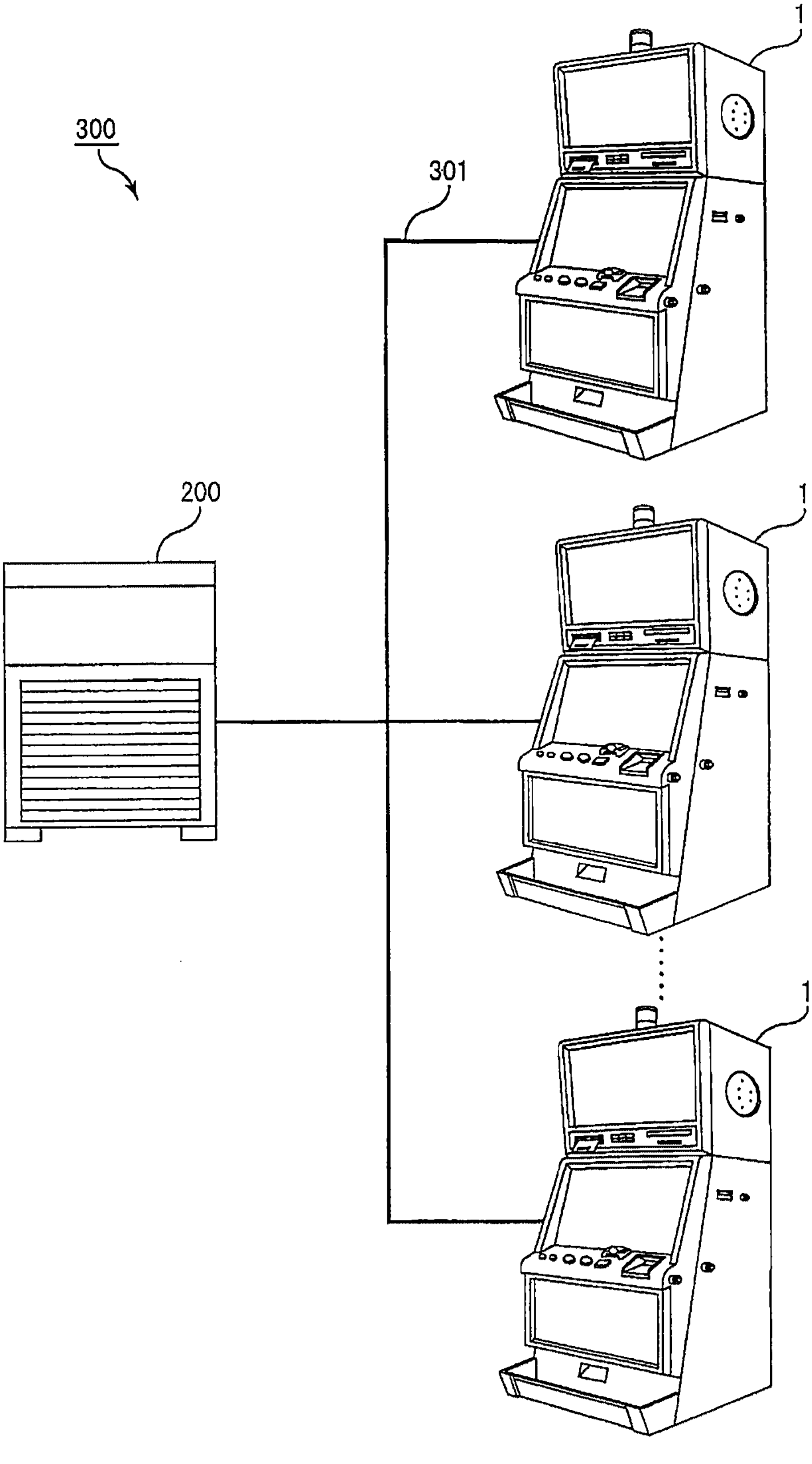
FIG. 3 is a view illustrating a game system including the gaming machine according to the embodiment of the present invention.

FIG. 3 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

The game system according to the present embodiment has been described above. Next, with reference to FIG. 4, an overall configuration of the gaming machine 1 is described.

Figure 4:
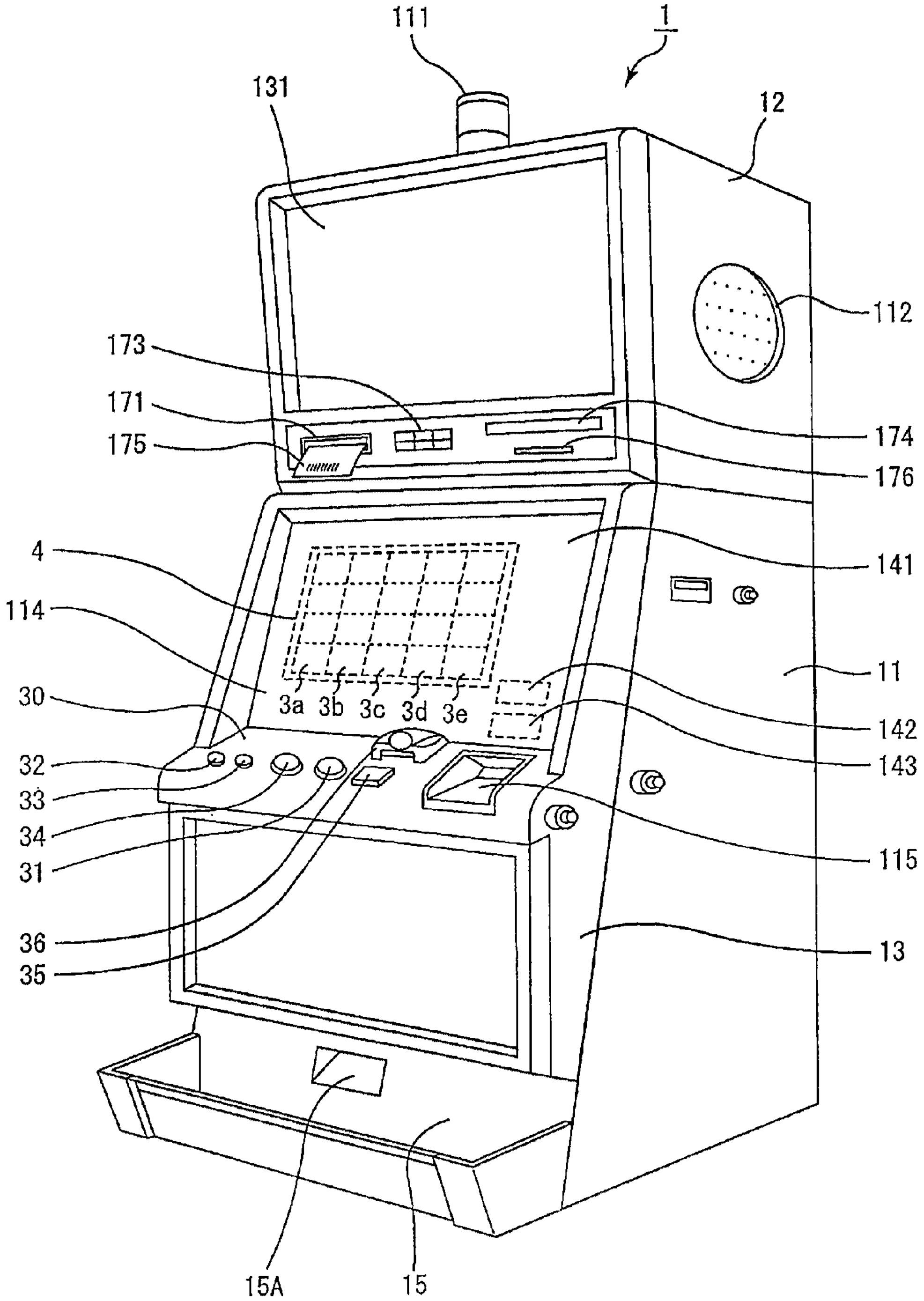
FIG. 4 is a view illustrating an overall configuration of the gaming machine according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line (hereinafter also referred to as a "pay line").

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

The lower image display panel 141 has a number-of-credits display region 142 and a number-of-payouts display region 143. The number-of-credits display region 142 displays the number of coins which are owned by a player and deposited inside of the gaming machine 1(hereinafter, referred to as the number of credits). In addition, the number-of-payouts display region 143 displays the number of coins to be paid out to a player when a winning prize is established (hereinafter, referred to as the number of payouts).

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling or stopping scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETS to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating a configuration of the symbol arrays included in the video reels of the gaming machine according to the embodiment of the present invention.

A first video reel 3*a*, a second video reel 3*b*, a third video reel 3*c*, a fourth video reel 3*e*, and a fifth video reel 3*d* each is assigned with a symbol array consisting of 22 symbols that correspond to respective code numbers from "00" to "21".

Types of the symbols provided are "JACKPOT 7", "BLUE 7", "CHERRY", "STRAWBERRY", "CHERRY", "PLUM", "ORANGE", and "APPLE".

As shown in FIG. 20, a sequence of a maximum of 52 symbol arrays is predetermined, parts of the arrays are selectively combined with each other, and thereby the symbol arrays of the five video reels 3*a*, 3*b*, 3*c*, 3*d*, and 3*e* can be determined, respectively. The table shown in FIG. 20 is previously stored in the ROM 72. In FIG. 20, "REEL 1", "REEL 2", "REEL 3", "REEL 4", and "REEL 5" designate video reels 3*a*, 3*b*, 3*c*, 3*d*, and 3*e*, respectively.

Defining such a table makes it possible to determine the symbol arrays shown in FIG. 5, and to scroll-display or stop-display. In the embodiment, as shown in FIG. 20, WILD symbols (symbols displayed as "WILD" in FIG. 20) are included. Selectively combining some of the symbols of the symbol array in the FIG. 20 with each other makes it possible to determine symbol arrays including WILD symbols as symbols constituting each of the five video reels. The determined symbol arrays are scroll-displayed or stop-displayed, and the symbols can be thereby rearranged. In addition, in the embodiment, symbols including a maximum of continuous 10 WILD symbols can be scroll-displayed or stop-displayed.

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
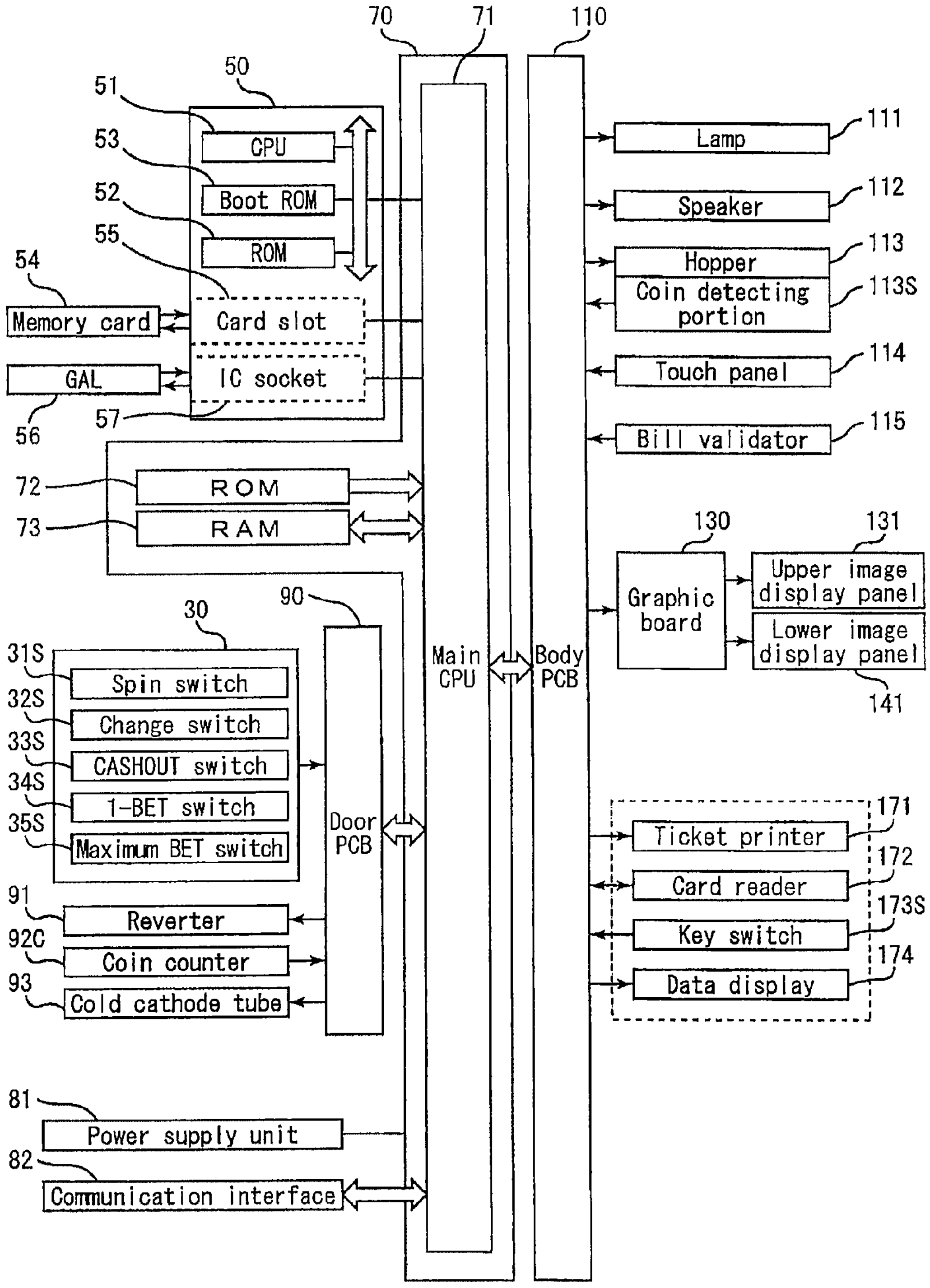
FIG. 6 is a block diagram illustrating an internal configuration of the gaming machine according to the embodiment of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 8 to 16 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "JACKPOT 7", and includes seven symbols of "ORANGE". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 70 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images so as to be conducted by the respective one of the upper image display panel 131 and the lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with: a VDP adapted to generate image data: and a storage medium such as a video RAM adapted to store the image data generated by means of the VDP. The number of credits stored in the RAM 73 is displayed in the number-of-credits region 142 of the lower image display panel 141. The payout number of coins is displayed in the number-of-payouts display region 143 of the lower image display panel 141.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Symbol Combination Table]

A circuit configuration of the gaming machine 1 has been described above. Next, referring to FIG. 7, a symbol combination table will be described. FIG. 7 is a view showing a symbol combination table of the gaming machine according to the embodiment of the present invention.

The symbol combination table specifies combinations of symbols according to winning prizes and the number of payouts. In the gaming machine 1, after scroll of the symbol array of each video reel 3 has been stopped, a winning prize is established in the case where a combination of the symbols displayed on a payline is coincident with that of the symbols specified by the symbol combination table. A player is then given a privilege such as coin payout or start of bonus game according to a winning combination. In the case where a combination of the symbols displayed on the payline fails to coincide with any combination of the symbols specified by the symbol combination table, no winning prize (so called "losing") is established.

Basically, a winning prize is established in the case where all of the symbols that are displayed on the payline by the respective video reels 3 are those of one of the several types, "JACKPOT 7", "APPLE", "BLUE 7", "BELL", "CHERRY", "STRAWBERRY", "PLUM", and "ORANGE". As to the symbols of types "CHERRY" and "ORANGE", respectively, a winning prize is established in the case where one or three of the symbols of one of these types is or are displayed on the payline by video reel 3 as well. For example, in the case where "BLUE 7" symbols are displayed on the payline by all of the video reels 3, a winning combination is established as "BLUE", and "10" is determined as the number of payouts. Coin payout is then performed based on the determined number of payouts. This coin payout is performed by actually discharging coils from a coin payout exit 15A, adding to the number of credits, or alternatively, issuing a barcode ticket.

"JACKPOT 7" is a symbol related to a jackpot trigger. In the case where "JACKPOT 7" symbols are displayed on the payline by all of the video reels 3, a winning combination is established as a "jackpot", and the amount of jackpot is determined as the number of payouts. "APPLE" is a symbol related to a bonus game trigger. In the case where "APPLE" symbols are displayed on the payline by all of the video reels 3, a winning combination is established as a "bonus game trigger", and a bonus game is started at the next time of play or subsequent.

[Contents of Program]

The symbol combination table has been described above. Next, with reference to FIGS. 8 to 16, the program to be executed by the gaming machine 1 is described.

<Main Control Processing>

Figure 8:
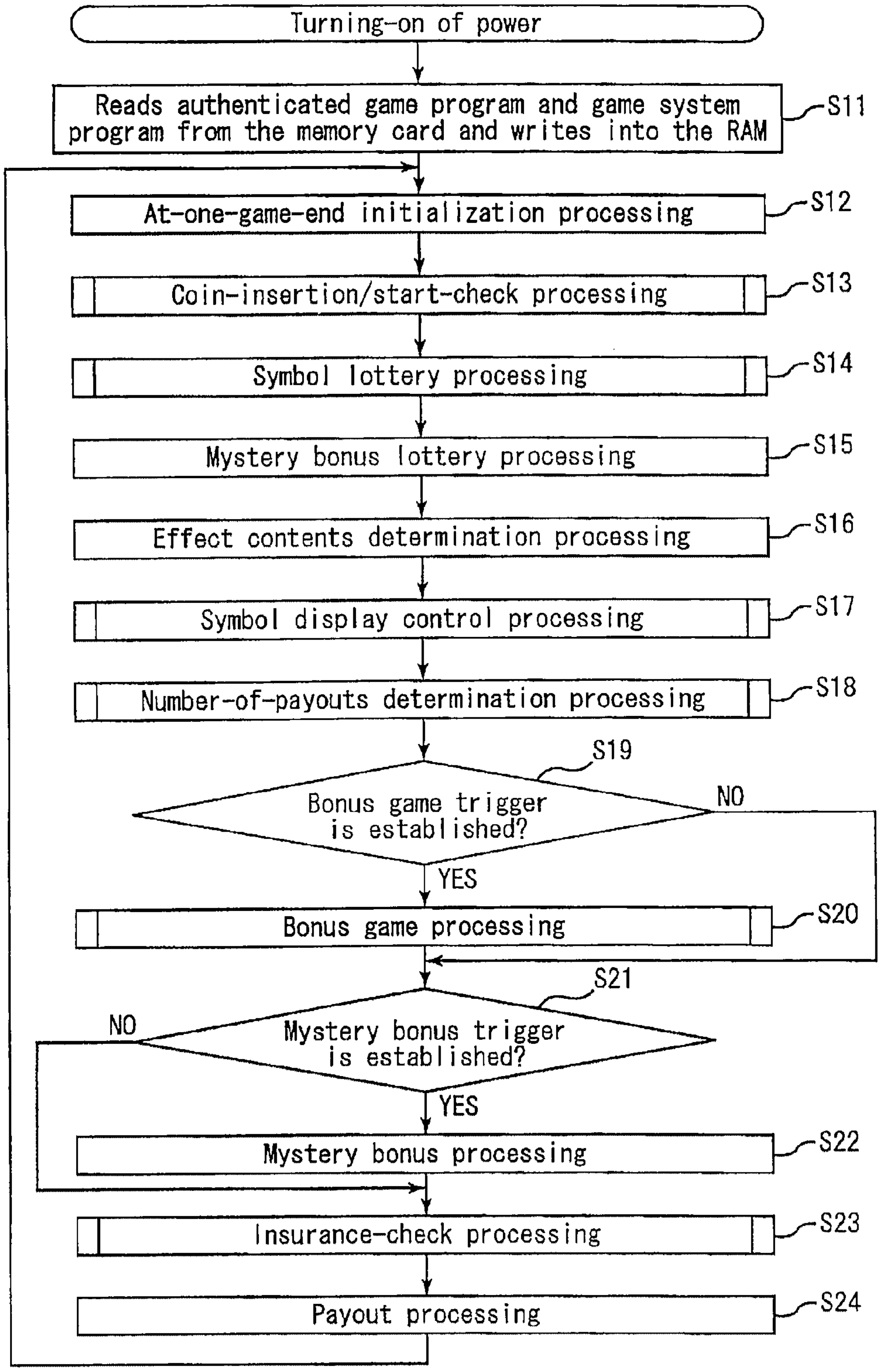
FIG. 8 is a flowchart illustrating a subroutine of main control processing for the gaming machine according to the embodiment of the present invention.

First, with reference to FIG. 8, main control processing is described.

FIG. 8 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, inputs from the BET switch and the spin switch are checked.

The main CPU 71 then conducts symbol lottery processing which is described later with reference to FIG. 12 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 14 (step S18). In the processing, the number of payouts is determined based on the combination of symbols displayed along one of the winning lines, and is stored into a number-of-payouts counter provided in the RAM 73.

Next, the main CPU 71 determines whether or not a bonus game trigger has been established (step S19). When determining that the bonus game trigger has been established, the main CPU 71 conducts bonus game processing to be described later with reference to FIG. 16 (step S20).

Subsequent to the processing in step S20 or when determining that the bonus game trigger has not been established in step S19, the main CPU 71 determines whether or not a mystery bonus trigger has been established (step S21). When determining that the mystery bonus trigger has been established, the main CPU 71 conducts mystery bonus processing (step S22). In the processing, the number of payouts set for mystery bonus (300, for example) is stored in a number-of-payouts storage area provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts counter to a number-of-credits counter provided in the RAM 73. It is to be noted that operations of the hopper 113 may be controlled based on input from the CASHOUT switch 33S, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded. After the processing has been conducted, the processing is shifted to step S12.

<Coin-Insertion/Start-Check Processing>

Figure 9:
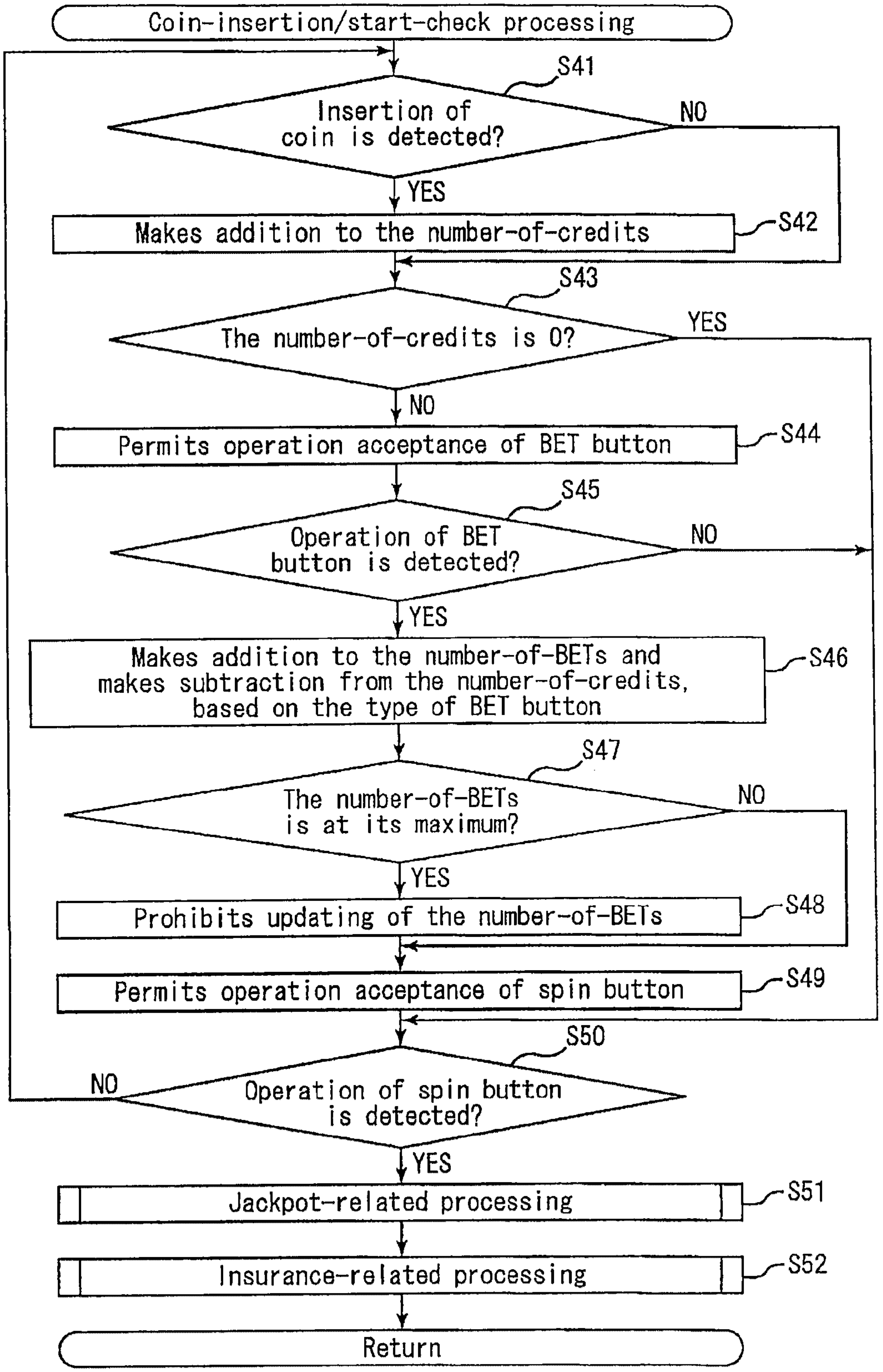
FIG. 9 is a flowchart illustrating a subroutine of coin-insertion/start-check processing for the gaming machine according to the embodiment of the present invention.

Next, with reference to FIG. 9, coin-insertion/start-check processing is described.

FIG. 9 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 10 (step S51). In the processing, the amount to be accumulated to the amount of jackpot is calculated, and the amount is transmitted to the external control device 200.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Jackpot-Related Processing>

Figure 10:
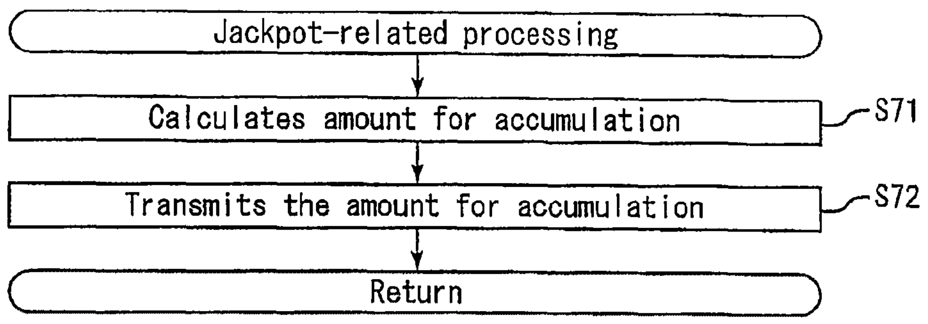
FIG. 10 is a flowchart illustrating a subroutine of jackpot-related processing for the gaming machine according to the embodiment of the present invention.

Now, with reference to FIG. 10, the jackpot-related processing is described.

FIG. 10 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 11:
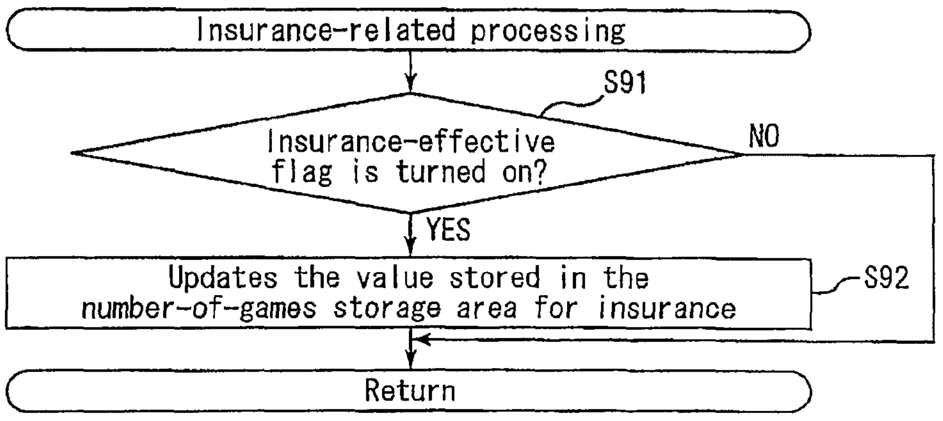
FIG. 11 is a flowchart illustrating a subroutine of insurance-related processing for the gaming machine according to the embodiment of the present invention.

Next, with reference to FIG. 11, the insurance-related processing is described.

FIG. 11 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 12:
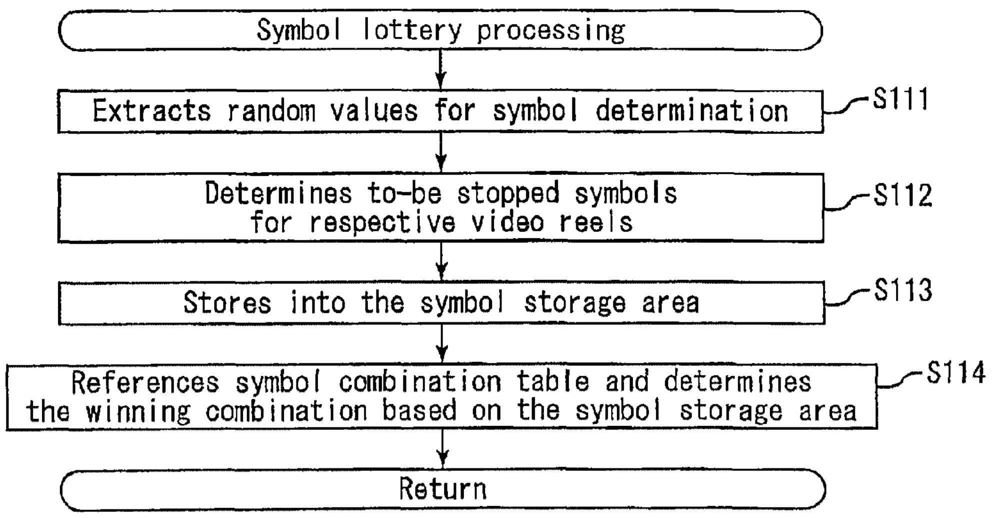
FIG. 12 is a flowchart illustrating a subroutine of symbol lottery processing for the gaming machine according to the embodiment of the present invention.

Next, with reference to FIG. 12, the symbol lottery processing is described.

FIG. 12 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 references the number-of-payouts determination table (FIG. 7) and determines a winning combination based on the symbol storage area (step S114). The main CPU 71 determines the winning combination based on the combination of symbols to be displayed along the winning line by the respective video reels 3 and the number-of-payouts determination table. After the processing has been conducted, the symbol lottery processing is completed.

<Symbol Display Control Processing>

Figure 13:
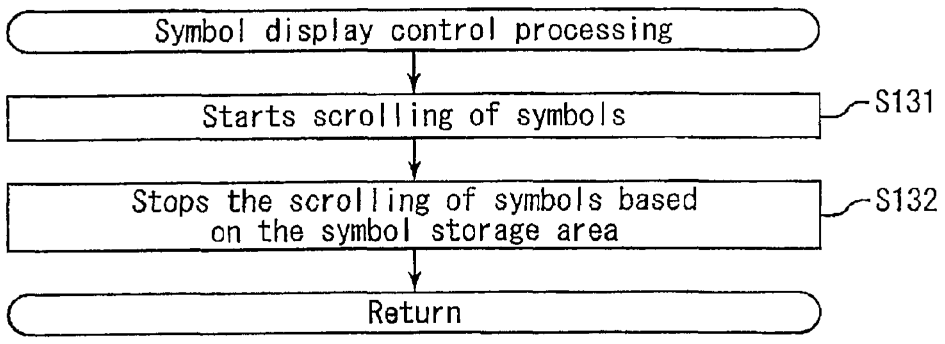
FIG. 13 is a flowchart illustrating a subroutine of symbol display control processing for the gaming machine according to the embodiment of the present invention.

Next, with reference to FIG. 13, the symbol display control processing is described.

FIG. 13 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

Figure 17:
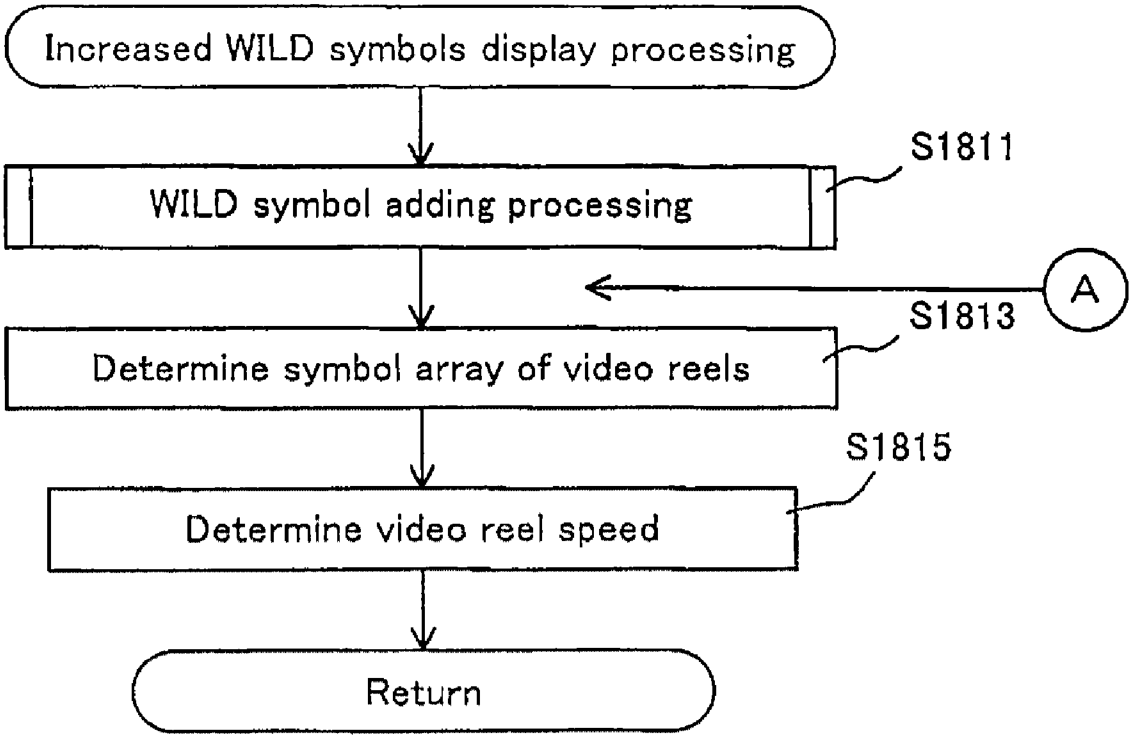
FIG. 17 is a flowchart illustrating a subroutine of increased WILD symbols display processing for the gaming machine according to the embodiment of the present invention.

When the speed of the video reels is determined in accordance with step S1843 of increased WILD symbols display processing, as shown in FIG. 17 to be described later, the scroll-display processing of step S131 is executed so that the speed of the scroll is equal to the speed of the video reels determined in accordance with step S1843.

Figure 19A:
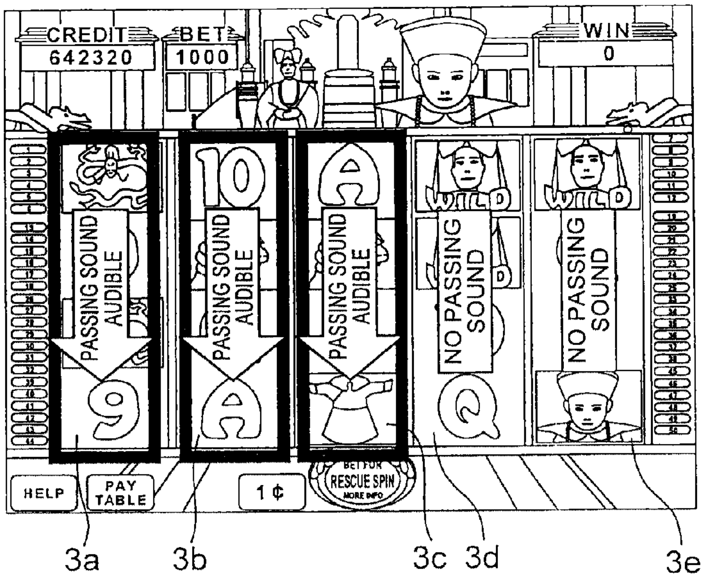
FIG. 19A illustrates a passing sound which is audible when top symbols of the five video reels 3*a*, 3*b*, 3*c*, 3*d*, and 3*e*, of the gaming machine according to the embodiment of the present invention pass.

A passing sound is audible when a top symbol passes, in the case where the symbol array of each video reel 3 has been scroll-displayed by executing the symbol display control processing shown in FIG. 13. The top symbol defined here is a symbol of the highest payment, among a plurality of symbols. In the embodiment, a plurality of top symbols is continuously arranged on video reels. The passing sound is adapted to be generated when a plurality of these continuously arranged top symbols pass. In particular, as shown in FIG. 19A, when among the five video reels 3*a*, 3*b*, 3*c*, 3*d*, and 3*e*, the top symbols of three video reels 3*a*, 3*b*, and 3*c* pass, the passing sound is audible. On the other hand, when the top symbols of the two video reels 3*d* and 3*e* pass, no passing sound is audible. Thus, a player can be notified of the fact that a plurality of top symbols pass, by way of a passing sound.

Figure 19B:
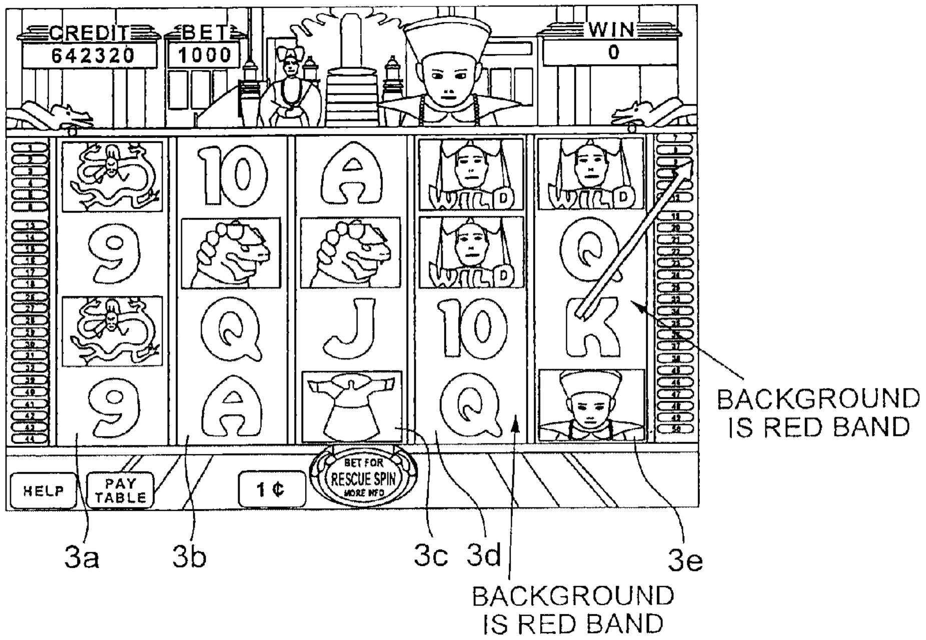
FIG. 19B illustrates a red band shown in the background of the five symbols that follow the top symbols.

As described above, in the embodiment, a plurality of top symbols are continuously arranged on video reels. As shown in FIG. 19B, the background band of the plurality of these top symbols, specifically of the five top symbols is colored red. As to the two video reels 3*d* and 3*e* which produce no passing sound, it is possible to readily visually recognize that a plurality of top symbols pass, depending on the background color of the symbols, and as to specific video reels, a player can be notified of the fact that a plurality of top symbols pass, by way of the background color.

<Number-of-Payouts Determination Processing>

Figure 14:
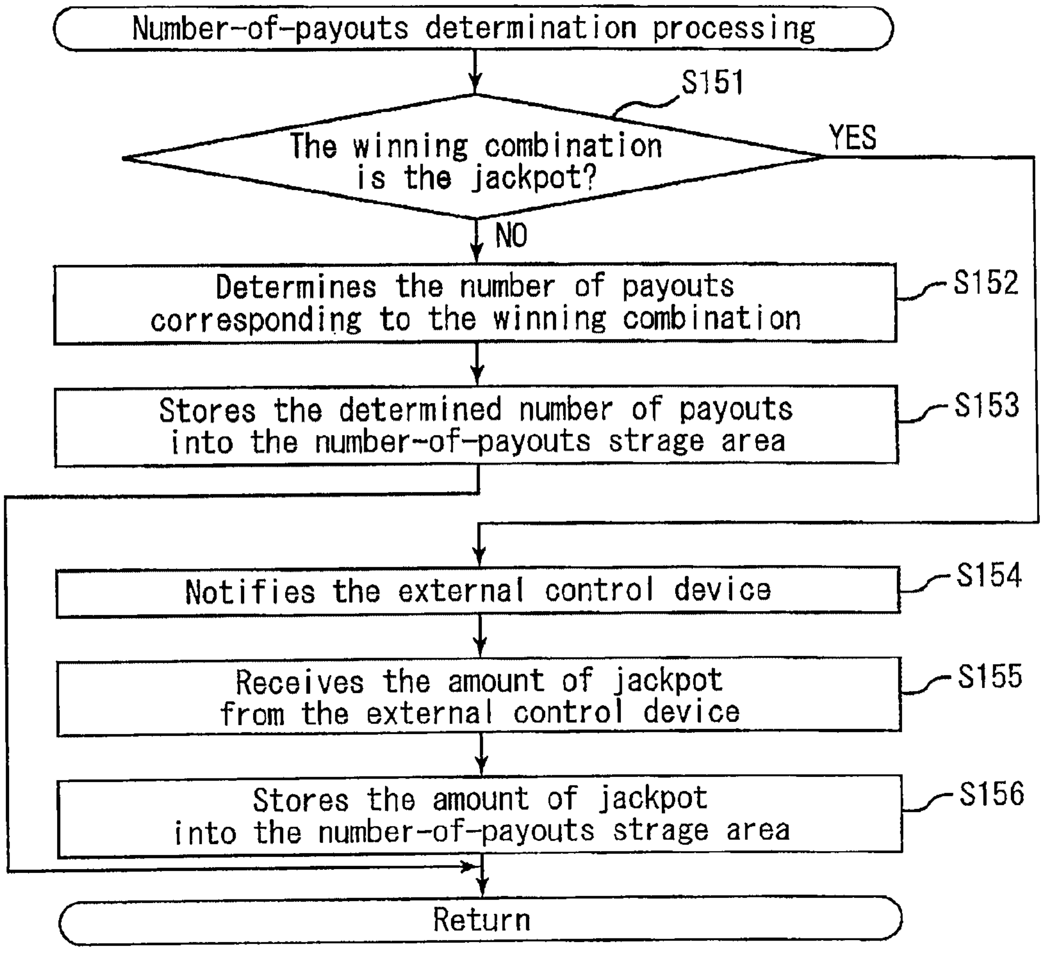
FIG. 14 is a flowchart illustrating a subroutine of number-of-payouts determination processing for the gaming machine according to the embodiment of the present invention.

Next, with reference to FIG. 14, the number-of-payouts determination processing is described.

FIG. 14 is a view illustrating a flowchart of the number-of-payouts determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the number of payouts corresponding to the winning combination (step S152). For example, when a winning combination is "BELL", "8" is determined as the number of payouts (see FIG. 7). It is to be noted that the main CPU 71 determines "0" as the number of payouts in the case where the game is lost. Next, the main CPU 71 stores the determined number of payouts into the number-of-payouts storage area (step S153). After the processing has been conducted, the number-of-payouts determination processing is completed.

When the main CPU 71 determines that the winning combination is the jackpot, the main CPU 71 notifies the external control device 200 of the winning of the jackpot (step S154).

It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-Check Processing>

Figure 15:
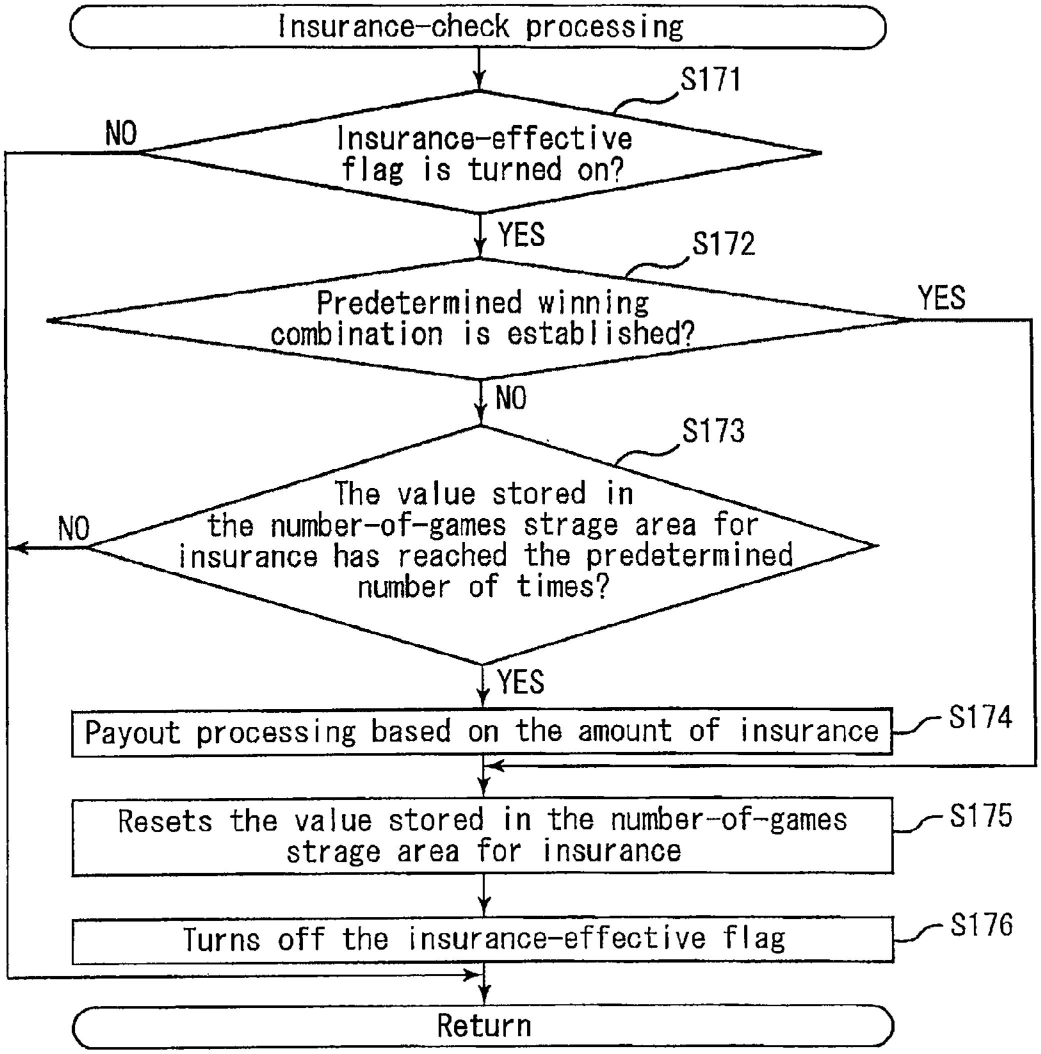
FIG. 15 is a flowchart illustrating a subroutine of insurance-check processing for the gaming machine according to the embodiment of the present invention.

Next, with reference to FIG. 15, the insurance-check processing is described.

FIG. 15 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "bonus game trigger", "jackpot" and "mystery bonus" are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 31 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

In the embodiment, when MAX-BET operation is made, an insurance-effective flag turns on, and thereafter, a state in which the insurance-effective flag is on continues until the insurance-effective flag is turned off by means of the above-described processing in step S176. In addition, by checking whether or not MAX-BET operation has been made in each game, the insurance-effective flag may be turned on only in the case where a player has made MAX-BET operation.

<Bonus Game Processing>

Figure 16:
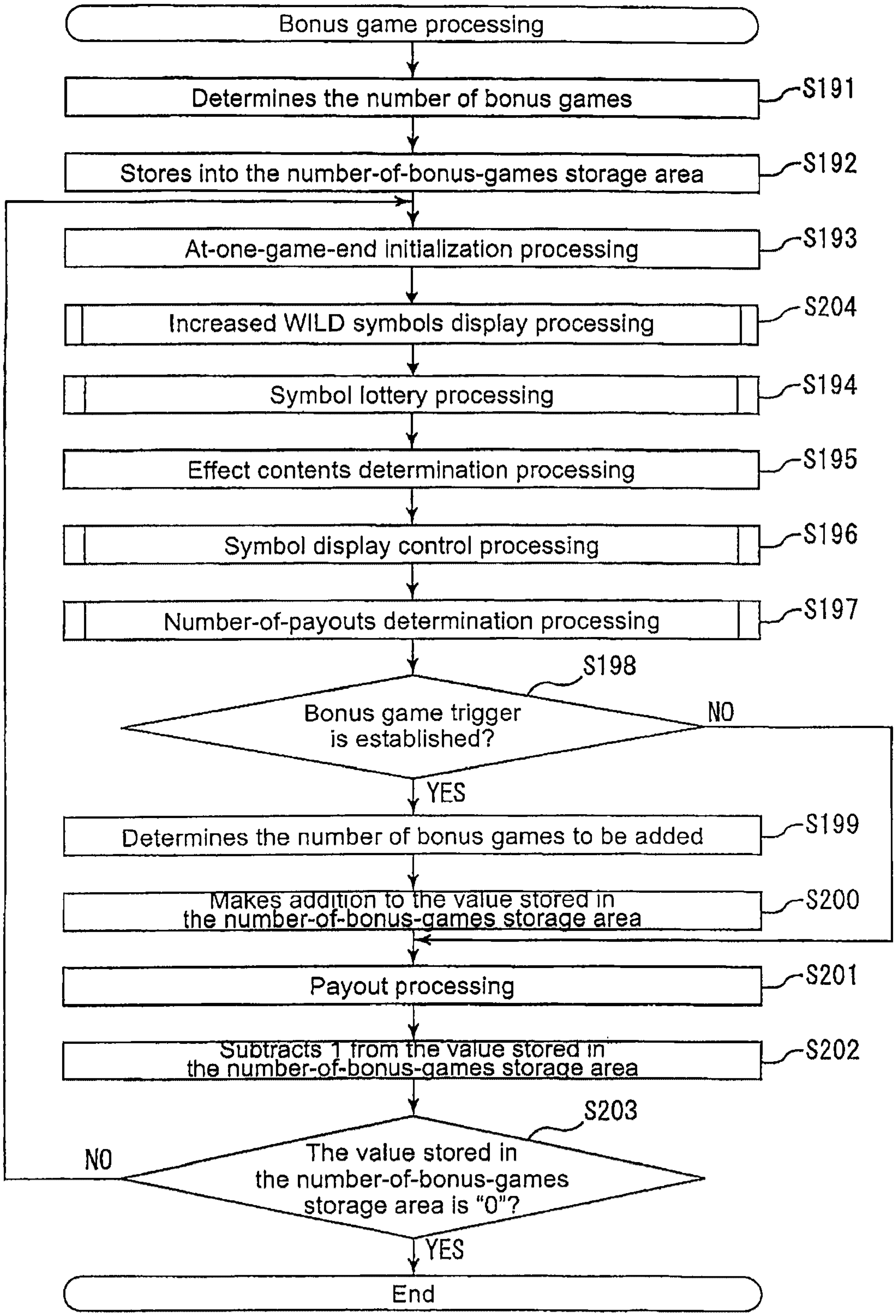
FIG. 16 is a flowchart illustrating a subroutine of bonus-game execution processing for the gaming machine according to the embodiment of the present invention.

Next, with reference to FIG. 16, bonus game processing will be described. FIG. 16 is a view showing a flowchart of bonus game processing for the gaming machine according to the embodiment of the present invention.

First, the main CPU 71 determines the number of bonus games (step S191). The main CPU 71 extracts random number values for determining the number of bonus games, and determines any of a plurality of bonus games, such as "50", "70", and "100", for example, by means of lottery.

Next, the main CPU 71 stores the determined number of bonus games in a number-of-bonus-games storage area provided in the RAM 73 (step S192).

Next, the main CPU 71 conducts at-one-game-end initialization processing, as in the processing of step S12 described with reference to FIG. 8 (step S193). Next, a subroutine of increased WILD symbols display processing, shown in FIG. 17 to be described later, is invoked and executed (step S204). The increased WILD symbols display processing will be described later in detail. Next, the main CPU 71 conducts symbol lottery processing described with reference to FIG. 12 (step S194). The main CPU 71 then conducts effect contents determination processing, as in the processing of step S16, described with reference to FIG. 8 (step S195). The main CPU 71 then conducts symbol display control processing described with reference to FIG. 13 (step S196). The main CPU 71 then conducts number-of-payouts determination processing, described with reference to FIG. 14 (step S197).

Next, the main CPU 71 determines whether or not a bonus game trigger has been established (step S198). When determining that the bonus game trigger has been established, the main CPU 71 determines the number of bonus games to be added (step S199). As in the above-described processing of step S191, the number of bonus games is determined. Next, the main CPU 71 adds the determined number of bonus games to a value stored in the number-of-bonus-games storage area (step S200).

Subsequent to the processing of step S200 or when determining that no bonus game trigger has been established in step S198, the main CPU 71 conducts payout processing (step S201). In the payout processing, the main CPU 71 adds the value stored in the number-of-payouts storage area in the above-described number-of-payouts determination processing of step S197 to the value stored in the number-of-payouts storage area for bonus. The number-of-payouts storage area for bonus is an area of storing a total number of payouts determined while in bonus game. When bonus game processing completes, the main CPU 71 adds the value stored in the number-of-payouts storage area for bonus to a value stored in the number-of-credits storage area provided in the RAM 73. Namely, a total number of payouts determined in a bonus game are collectively paid out. Coins may be discharged from the coin payout exit 15A or a barcode-attached ticket may be issued.

Next, the main CPU 71 subtracts 1 from the value stored in the number-of-bonus-games storage area (step S202). The main CPU 71 then determines whether or not the value stored in the number-of-bonus-games storage area is equal to 0 (step S203). When it is determined that the value stored in the number-of-bonus-games storage area is not equal to 0, the routine reverts to step S193. On the other hand, when it is determined that the value stored in the number-of-bonus-games storage area is equal to 0, bonus game processing is completed. After the bonus game processing is completed, the routine reverts to step S21 described with reference to FIG. 8.

<<Increased WILD Symbols Display Processing>>

FIG. 17 is a flowchart showing a subroutine of increased WILD symbols display processing. This subroutine is processed by being invoked in step S204 of the above-described bonus game processing of FIG. 16. Since the increased WILD symbols display processing is invoked in the bonus game processing of FIG. 16, this processing is executed when a bonus game, in particular a free game is played. As to a maximum number of free games which can be executed, 10 games are added when FEATURE IN is established and 5 games are added when retrigger is established.

In the present specification, a "WILD symbol" means an almighty symbol or a universal symbol. That is, in the case where a WILD symbol is included in a combination of the symbols stopped or rearranged, such a WILD symbol is handled as one of the symbols of several types of symbols so as to form a positive combination.

First, the main CPU 71 invokes and executes a subroutine of WILD symbols adding processing, shown in FIG. 31 to be described later (step S1811). By executing the WILD symbols adding processing, a predetermined number of WILD symbols can be added. For example, one WILD symbol can be added. Thus, a plurality of symbols including the added WILD symbols can be displayed in a symbol display region 4 of the lower image display panel 141. In the embodiment, by means of the processing in step S1811, WILD symbols are additionally displayed simultaneously for symbols of four video reels 3*b*, 3*c*, 3*d*, and 3*e* among the five video reels 3*a*, 3*b*, 3*c*, 3*d*, and 3*e*. That is, by executing the processing of step S1811 at one time, WILD symbols are added simultaneously for the four video reels 3*b* to 3*e*.

Next, the main CPU 71 determines symbol arrays to be displayed on the video reels 3*a*, 3*b*, 3*c*, 3*d*, and 3*e* (step S1813). By employing the symbol arrays determined by this processing, a plurality of symbols including the added WILD symbols can be scroll-displayed or stop-displayed or rearranged in the symbol display region 4.

Next, by referring to the speed determination table shown in FIG. 18A, the main CPU 71 determines a scroll speed (display speed) when scroll-displaying symbols (step S1815) according to the number of games played, and this subroutine is completed. Processing of symbol array scroll-display on each of the video reels 3 is executed in step S131 of FIG. 13 described above, so as to obtain the scroll speed (display speed) determined by means of the processing in step S1843.

The speed determination table shown in FIG. 18A defines an interrelationship between the number of games played and the number of frames. The number of games played is counted every time this subroutine is executed. The number of games played, shown in FIG. 18A is the one counted every time this subroutine is executed.

The interrelationship between the number of games played and the number of frames is predetermined as a speed determination table, and is stored in a ROM 72 of the gaming machine 1. As shown in FIG. 18A, the number of frames is defined to increase, as the number of games played increases. The number of frames is for determining the number of graphic display frames to be graphically displayed at unit time intervals. Increasing the number of graphic display frames at unit time intervals makes it possible to display the symbols in the symbol display region 4 at a reduced scroll speed. For example, 30 frames are rewritten within 1 second (30 fps). While in a basic game, 48 frames are required while reels make one rotation (48 frames/30 fps=1.6 seconds in terms of time). On the other hand, while in a free game, a maximum of 114 frames are required for reels to make one rotation (114 frames/30 fps=3.8 seconds in terms of time). As just described, the reel rotation speed is different between the play of a basic game and the play of a free game.

As described above, the speed determination table shown in FIG. 18A defines that the number of frames increases as the number of games played increases. Thus, the video reels can be displayed at a reduced scroll speed every time one game is played (every time one spin is performed).

The scroll speed is determined referring to the speed determination table shown in FIG. 18A, and the scroll speed can be thereby reduced up to predetermined times slower than usual. As shown in FIG. 18A, the usual number of frames is "48", and the number of frames in a tenth game is "114". Thus, in a free game, the scroll speed can be reduced every time one game is played, and symbols are scroll-displayed at a slowness of 114/48 times in the tenth game.

In the case where the scroll speed is determined by employing the speed determination table shown in FIG. 18A, even if more than 10 games are played, the scroll speed remains as it is reduced up to 1.5 times, and is no more varied. When more than 10 games are played, the scroll speed may be further reduced.

While the speed determination table shown in FIG. 18A defines the number of frames in association with the number of games played, the number of frames may be determined in accordance with the number of WILD symbols. For example, when an angel effect to be described later is executed, two more WILD symbols are assigned at one time. In this way, the of the video reels are displayed at a reduced scroll speed in accordance with the increased number of WILD symbols, so that a player can recognize the fact that the number of WILD symbols increases, can recognize the increased number of WILD symbols, and can enhance a sense of expectation for the game.

In the above-described example, the subroutine of the WILD symbols adding processing is immediately invoked and executed in step S1811; and therefore, the WILD symbols are always additionally displayed when a free game is started. On the other hand, this subroutine may be executed some time after a free game has been started. In this way, the WILD symbols are added in the middle of a free game which has already been started, and thereby there arises a high possibility that a game result favorable to a player can be obtained, and a sense of expectation for free game can be further enhanced.

For example, when a free game is started, the number of games required to start execution of this subroutine is determined. This processing may be determined in accordance with a result obtained by executing lottery processing. After the free game has been started, the number of free games played is counted. This subroutine is invoked and executed when the number of free games played is coincident with the determined number of games in lottery processing. Thus, symbols can be displayed in the middle of the free game which has already been started, while the number of WILD symbols is increased.

Figure 31:
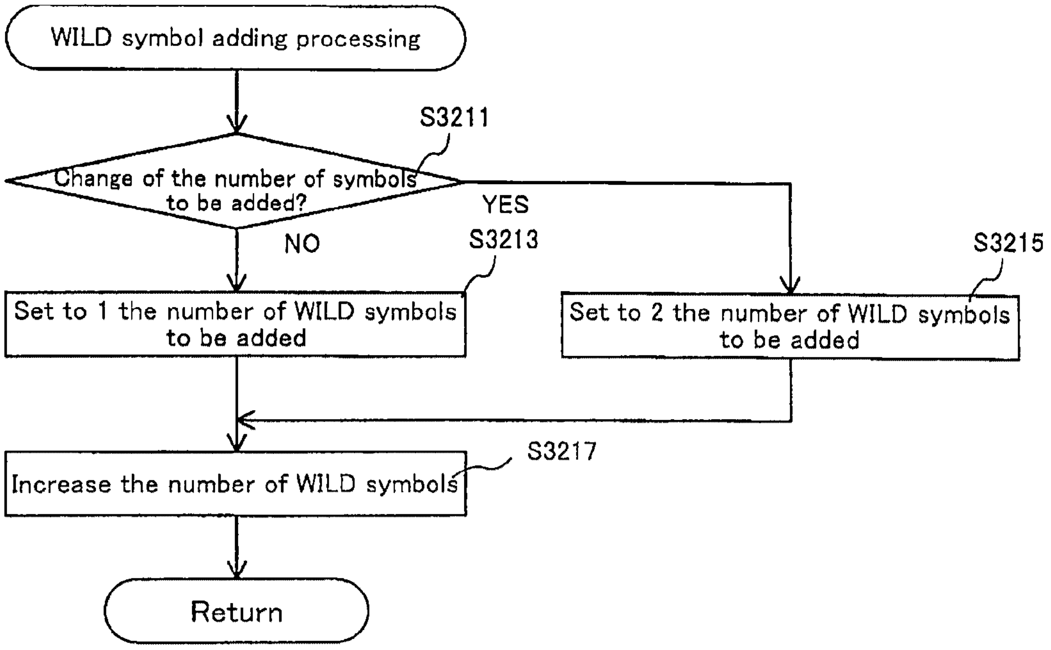
FIG. 31 is a flowchart illustrating a subroutine of processing of increasing the number of WILD symbols for the gaming machine according to the embodiment of the present invention.

While the above-described example showed a case in which the number of WILD symbols is gradually increased every time one game is played (every time one spin is performed) by means of the processing of step S3213 or S3217 in FIG. 31. However, the number of WILD symbols may be not only increased, but also maintained or reduced, as the number of games played increases. In particular, it is preferable that the number of WILD symbols is increased, reduced, or maintained in accordance with a result of symbol lottery processing.

For example, when the result of symbol lottery processing is the one favorable to a player, the number of WILD symbols is increased. Thus, a state which is more favorable to the player can be established by employing WILD symbols, and a sense of expectation for game can be enhanced. On the other hand, when the result of lottery processing is unfavorable to the player, the number of WILD symbols is reduced. Thus, a favorable result is unlikely to be obtained, it is possible to balance this case and the case of increasing the number of WILD symbols and producing the result favorable to the player. When the result of symbol lottery processing is favorable to the player to some extent, the number of WILD symbols is maintained as is.

FIG. 18B shows an example of an ordinary scroll speed and a scroll speed (slow) which is slower than the ordinary scroll speed as to five video reels. In FIG. 18B, "REEL 1", "REEL 2", "REEL 3", "REEL 4", and "REEL 5" indicate video reels 3*a*, 3*b*, 3*c*, 3*d*, and 3*e*, respectively. The number of frames shown in FIG. 18B is the one required for reels to make one rotation.

In the example shown in FIG. 18B, at the ordinary scroll speed, the number of symbols for "REEL 1" is 12, and the number of frames therefor is 48. The number of symbols for "REEL 2" is 19, and the number of frames therefor is 76. The number of symbols for "REEL 3" is 26, and the number of frames therefor is 104. The number of symbols for "REEL 4" is 33, and the number of frames therefor is 132. The number of symbols for "REEL 5" is 40, and the number of frames therefor is 160.

On the other hand, in the case where the scroll speed is reduced (slow), the number of symbols is increased for all of the five reels by addition of WILD symbols. Specifically, the number of symbols for "REEL 1" is 19, and the number of frames therefor is 114. The number of symbols for "REEL 2" is 26, and the number of frames therefor is 156. The number of symbols for "REEL 3" is 33, and the number of frames therefor is 196. The number of symbols for "REEL 4" is 40, and the number of frames therefor is 240. The number of symbols for "REEL 5" is 47, and the number of frames therefor is 282.

<<WILD Symbols Adding Processing>>

FIG. 31 is a flowchart showing a subroutine of processing of increasing the number of WILD symbols. This subroutine is invoked and executed in step S1811 of the increased WILD symbols display processing in FIG. 17, described above.

First, the main CPU 71 determines whether or not to change the number of WILD symbols to be added (step S3211). It is preferable to determine whether or not to change the number of WILD symbols to be added, by means of lottery processing, when a free game has been started as a bonus game.

Figure 29A:
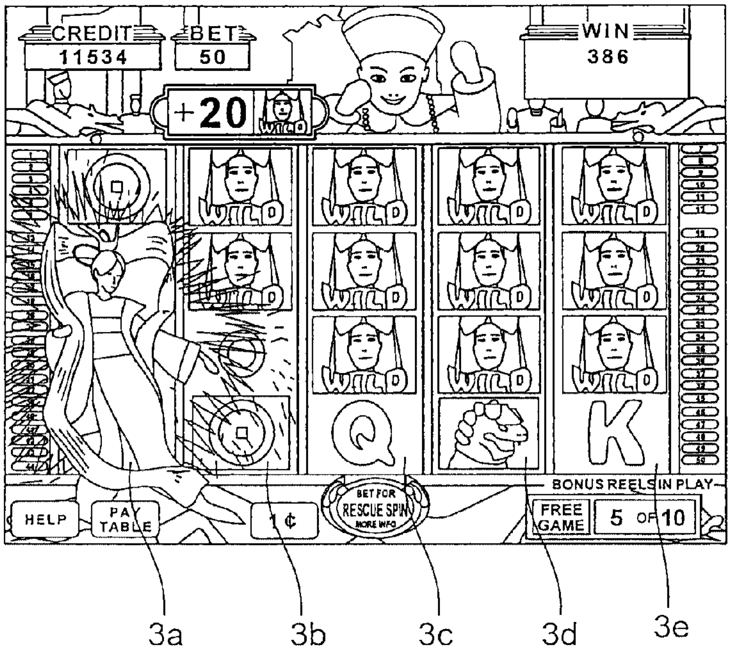
FIGS. 29A and 29B show: an image displayed when the gaming machine according to the embodiment of the present invention executes an effect called an "angel effect"; and an image displayed while in a free game, respectively.

In the lottery processing, it is preferable to determine whether or not to produce a predetermined effect, for example, an angel effect, as well as whether or not to change the number of WILD symbols to be added. A determined probability of producing the angel effect is a given value, for example, 60 percents. For example, when it is determined to produce the predetermined effect, for example, the angle effect by the processing, an image of an angle is displayed at a position where the first video reel 3*a* is displayed, as shown in FIG. 29A. This displayed image of the angel makes it possible to indicate that WILD symbols are to be added. Further, the displayed image of the angel makes it possible to indicate that two WILD symbols are to be added.

In addition, when it is determined to produce the angel effect, a timing of producing the angel effect is also determined by means of lottery processing. For example, what number game to produce the angel effect after a free game has been started is also determined by means of lottery processing.

Further, in the embodiment, only one angle effect is produced in one free game. A plurality of angel effects may be produced in one free game without being limitative thereto. For example, the number of times or the timing of producing the angel effect may be determined by the results of the lottery processing or by means of weighted lottery processing, in accordance with the history of games such as the number of games that have been played so far.

When determining that the number of WILD symbols to be added is not changed in the determination processing of step S3211 (NO), i.e., when determining that no angel effect is produced, the main CPU 71 sets to 1 the number of WILD symbol to be added (step S3213). On the other hand, when determining that the number of WILD symbols to be added is changed in the determination processing of step S3211 (YES), the CPU 71 set to 2 the number of two WILD symbols to be added (step S3215). Thus, when no angel effect is produced, only one WILD symbol can be added, and when the angel effect is produced, two WILD symbols can be added. The number of WILD symbols to be increased can be previously suggested to a player by means of the angel effect, which can enhance the player's sense of expectation. As described above, a predetermined number of WILD symbols are added to the four video reels 3*b* to 3*e*, and two WILD symbols are also added to each of the four video reels 3*b* to 3*e*.

Next, when executing the above-described processing of step S3213 or S3215, the main CPU 71 determines a total number of WILD symbols at that time point (step S3217), and this subroutine is completed. By executing this processing, a plurality of symbols including the total number of WILD symbols is displayed in the symbol display region 4.

<<A Variety of Effect Contents>>

The effect contents are determined by means of the processing in step S16 of FIG. 8 or the processing in step S195 of FIG. 16, and images corresponding to the determined effect contents are displayed on the upper image display panels 131 and the lower image display panels 141.

<Li-Zhi by Well-Aimed Hit from the Spin Button>

FIGS. 21A, 21B-1, 21B-2, 21B-3, 21C-1, 21C-2, and 21C-3 show images when an effect called li-zhi by a well-aimed hit from the spin button has been produced. First, a condition for producing li-zhi by a well-aimed hit from the spin button is that trigger symbols are stopped on both of the first and second video reels 3*a* and 3*b* while in a basic game. When this condition is established, li-zhi by a well-aimed hit from the spin button is produced at a probability of 100%. In the embodiment, a well-aimed hit from the spin button can be performed for only the third video reel 3*c* (see FIG. 21A).

Figure 21A:
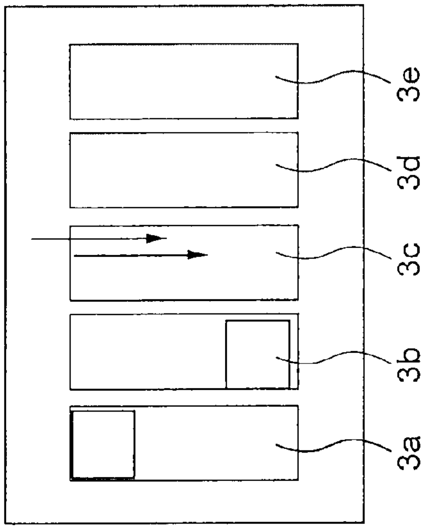
Figures 1, 21B:
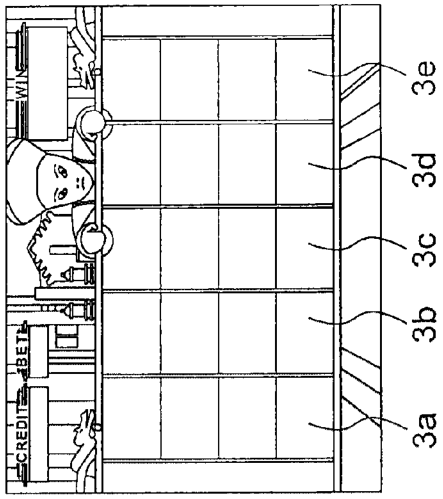
Figures 1, 21C:
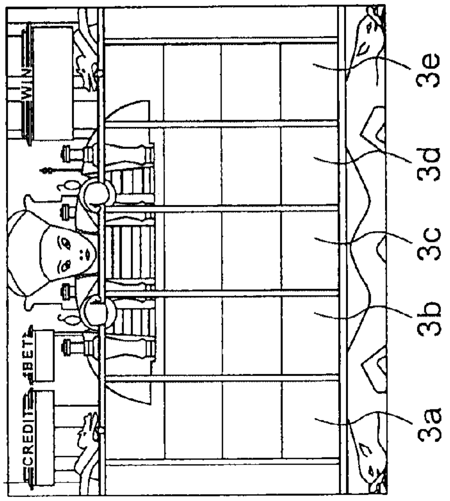
Figures 2, 21B:
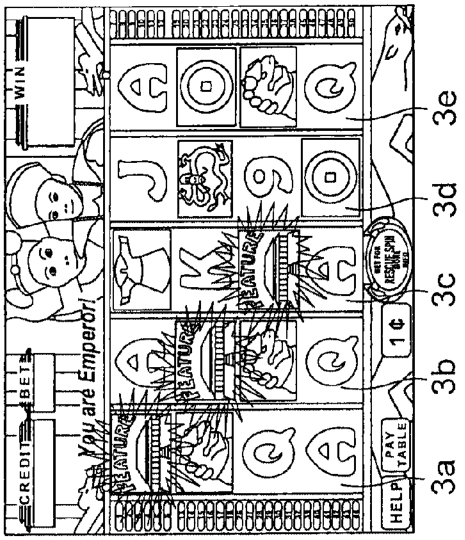
Figures 3, 21B:
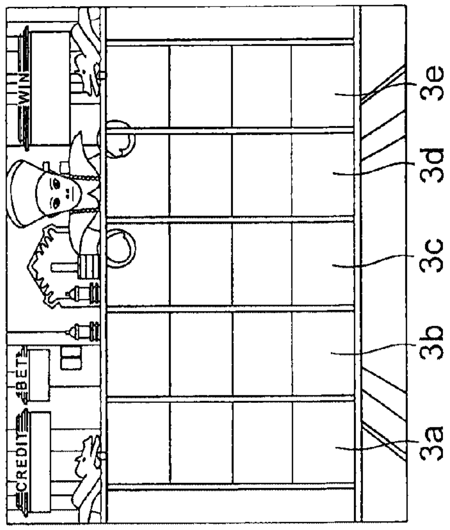
Figures 2, 21C:
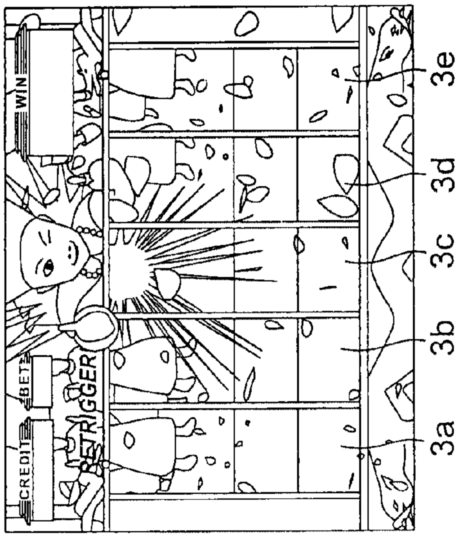
Figures 3, 21C:
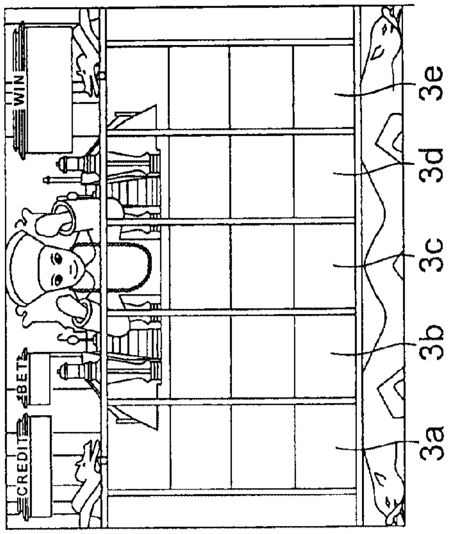

Further, the li-zhi by a well-aimed hit from the spin button sometimes extends to a long effect over a long period of time (at the time of long extension of the li-zhi by a well-aimed hit from the spin button). In this case, when a basic game is played, scroll-displayed symbols temporarily disappear (FIG. 21B-1). Afterwards, in the case where a winning combination is established, the symbols are stop-displayed and rearranged (FIG. 21B-2). On the other hand, in the case of "losing", the symbols disappear again (FIG. 21B-3). When a free game is played as a bonus game, scroll-displayed symbols temporarily disappear and a streak of light is displayed (FIG. 21C-1). Afterwards, in the case of a winning combination is established, a plurality of animation characters are displayed together with a streak of light at an upper side while the symbols disappear, and an image of flower petals falling is then displayed (FIG. 21C-2). On the other hand, in the case of "losing", the streak of light disappears, and the symbols also disappear.

<Emperor Effect 1>

FIGS. 22A-1, 22A-2, 22B-1, and 22B-2 show images when an effect called emperor effect 1 has been produced.

Figures 1, 22A:
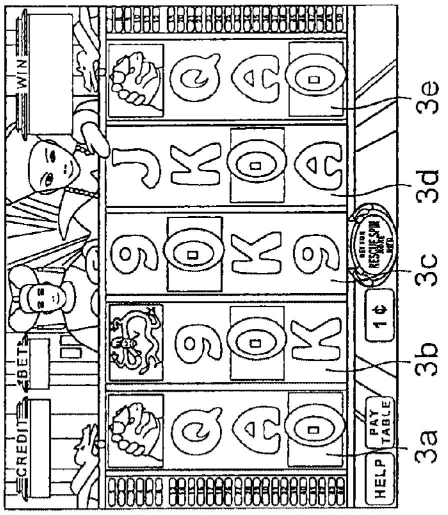
Figures 2, 22A:
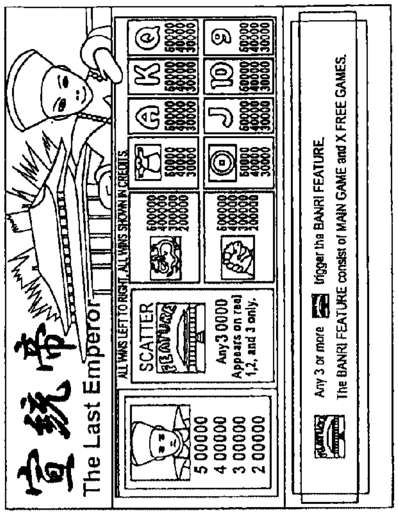

First, in the case where "TOTAL BET×5" or more and less than "TOTAL BET×25" is established while in a basic game, symbols are first scroll-displayed (FIG. 22A-1) and an image is displayed indicating that an animation character displayed at the upper side of the scroll display region takes action of touching the scroll-display region with his hand (FIGS. 22A-1 and 22A-2).

Figures 1, 22B:
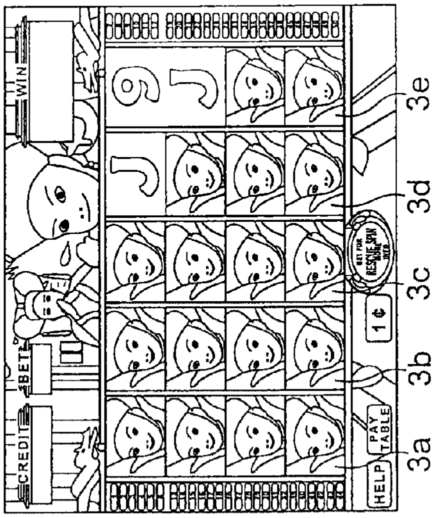
Figures 2, 22B:
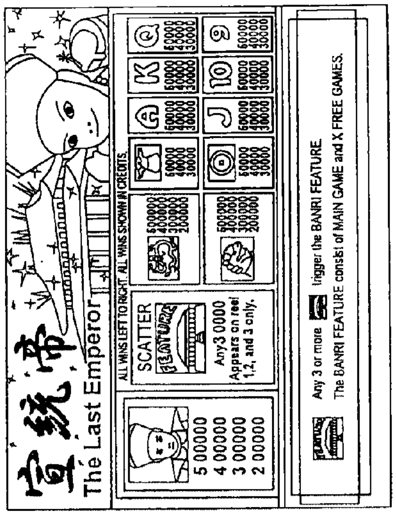

In the case where "TOTAL BET×25" or more is established while in a basic game, a plurality of symbols formed by the animation character's face is first scroll-displayed (FIG. 22B-1) and an image is displayed indicating that the animation character displayed at the upper side of the scroll-display region takes action of pointing to the scroll-display region (FIGS. 22B-1 and 22B-2).

<Emperor Effect 2>

FIGS. 23A-1, 23A-2, 23B-1, and 23B-2 show images when an effect called emperor effect 2 has been produced.

Figures 1, 23A:
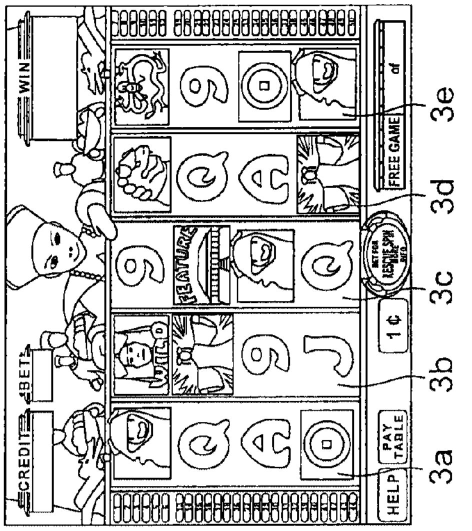
Figures 2, 23A:
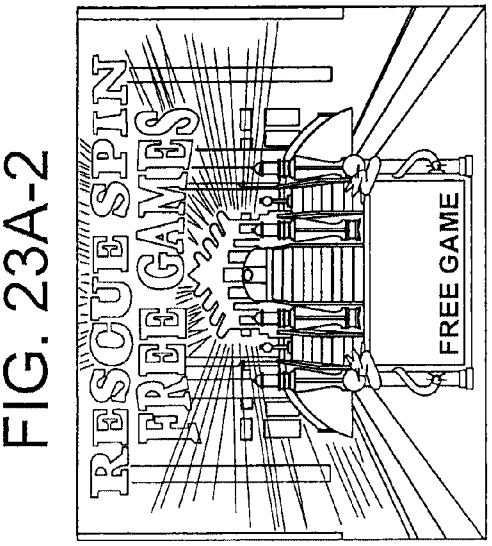

First, in the case where "TOTAL BET×5" or more and less than "TOTAL BET×25" is established while in a free game as a bonus game, symbols are first scroll-displayed and an image is displayed indicating that the animation character displayed at the upper side of the scroll-display region takes action of touching the scroll-display region with his hand (FIG. 23A-1). Next, on the screen, character strings "RESCUE SPIN" and "FREE GAMES" are displayed at the upper and lower stages, respectively (FIG. 23A-2).

Figures 1, 23B:
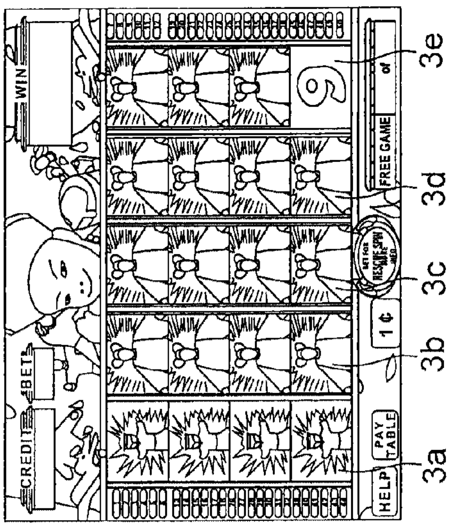
Figures 2, 23B:
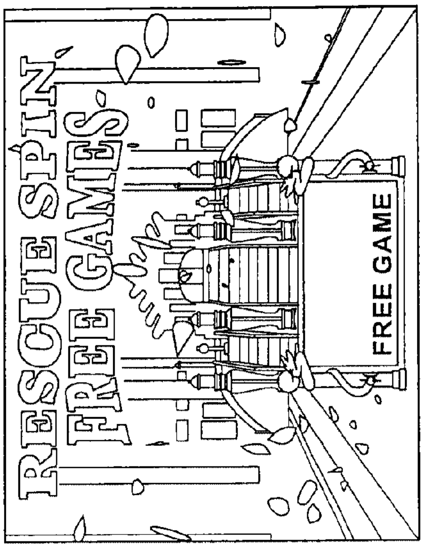

In the case where "TOTAL BET×25" or more is established while in a free game as a bonus game, a plurality of symbols formed by the upper half of an animation character's body are scroll-displayed and an image is displayed indicating that the animation character displayed at the upper side of the scroll display region takes action of pointing to the scroll-display region (FIG. 23B-1). Next, the character strings "RESCUE SPIN" and "FREE GAMES" are displayed at the upper and lower stages, respectively, and an image of the streak of light and flower petals falling is also displayed (FIG. 23B-2).

<Announcement of the Forbidden City (FEATURE IN Established Effect)>

Figure 24A:
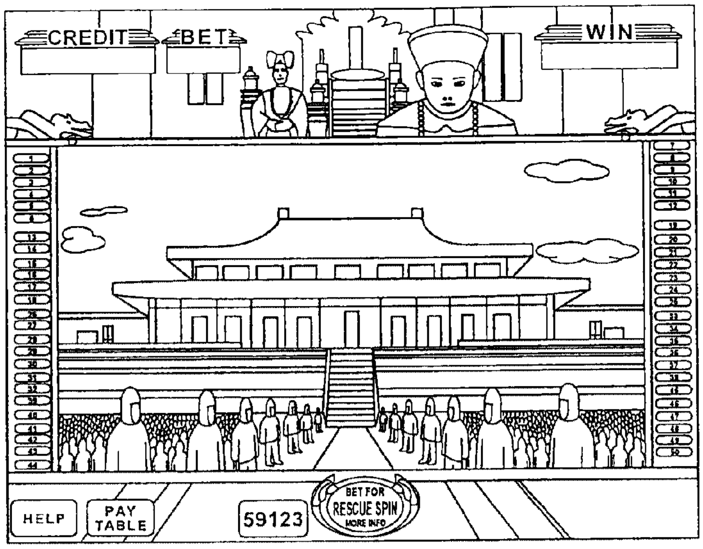
FIGS. 24A, 24B, 24C, and 24D are images displayed when the gaming machine according to the embodiment of the present invention produces effects called an announcement of the Forbidden City (effect of FEATURE IN established); payment announcement 1 (effect of small WIN or more established); payment announcement 2 (effect of middle WIN or more established); and payment announcement 3 (effect of big WIN or more established), respectively.

FIG. 24A shows an image when an effect called announcement of the Forbidden City (FEATURE IN established effect) has been produced.

On a condition that no retrigger is performed while in a basic game or a free game and that three trigger symbols are stopped, an effect called announcement of the Forbidden City (FEATURE IN established effect) is produced at a predetermined probability, for example, at a probability of 30%.

First, the screen darkens suddenly at the same time as SPIN button is depressed. Meter systems such as CREDIT, BET, and WIN are not darkened. Next, an image of a castle is displayed so as to emerge. Further, the displayed castle then disappears, and video reels start stopping. In this manner, trigger symbols are stop-displayed on the first video reel 3*a*, the second video reel 3*b*, and the third video reel 3*c*.

<Payment Announcement 1 (Small Win or More Established Effect)>

Figure 24B:
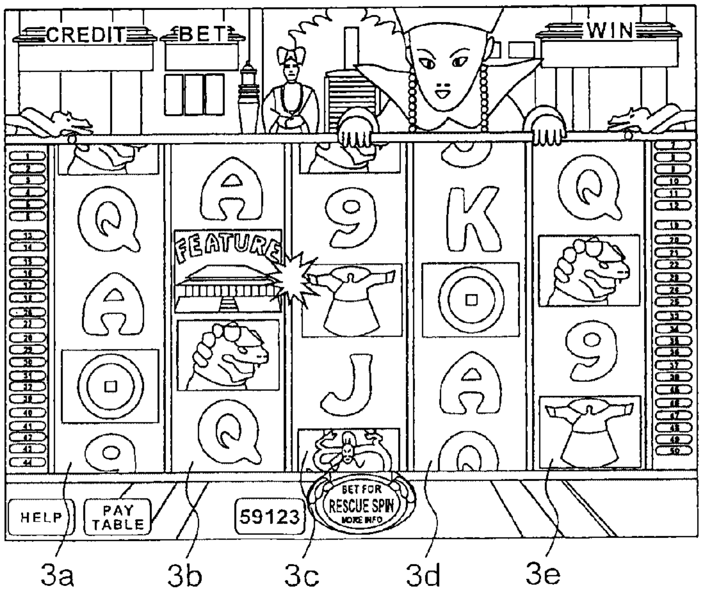

FIG. 24B shows an image when an effect called payment announcement 1 (small WIN or more established effect) has been produced.

When the WIN credit is TOTAL BET×5 or more, an effect called payment announcement 1 (small WIN or more established effect) is produced at a predetermined probability, for example, at a probability of 30%. In this effect, a symbol display region is displayed darkly, and an animation character is displayed brightly at the upper part of the symbol display region.

<Payment Announcement 2 (Middle Win or More Established Effect)>

Figure 24C:
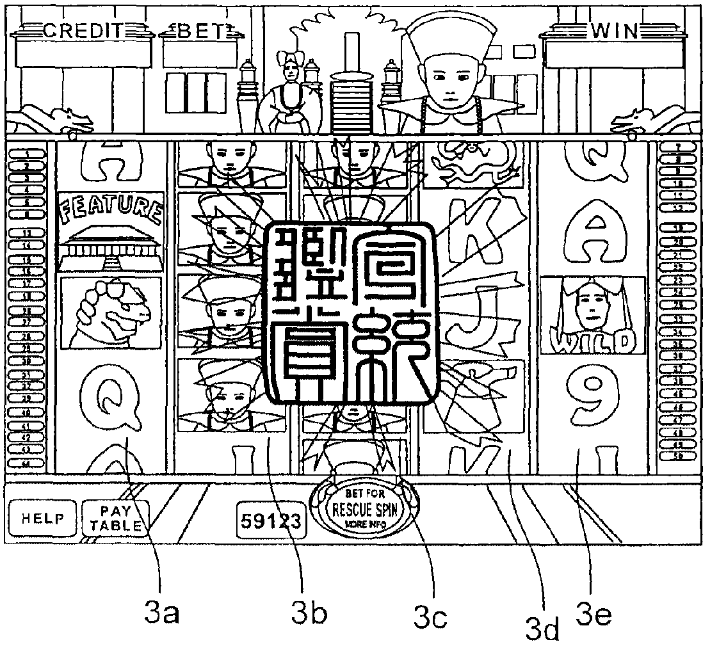

FIG. 24C shows an image when an effect called payment announcement 2 (middle WIN or more established effect) has been produced.

When the WIN credit is TOTAL BET×10 or more, an effect called payment announcement 2 (middle WIN or more established effect) is produced at a predetermined probability, for example, at a probability of 30%. In this effect, the screen fluctuates at the same time as the SPIN button is depressed, and the screen displays the scene wherein an earthquake occurs. Thereafter, predetermined characters and the halo-like streak of spreading light behind the characters are displayed.

<Payment Announcement 3 (Big Win or More Established Effect)>

Figure 24D:
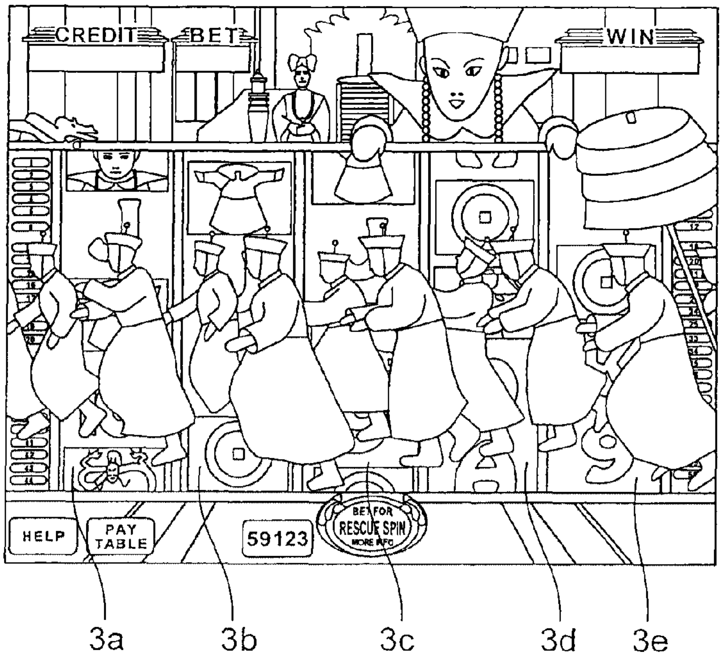

FIG. 24D shows an image when an effect called payment announcement 3 (big WIN or more established effect) has been produced.

When the WIN credit is TOTAL BET×20 or more, an effect called payment announcement 3 (big WIN or more established effect) is produced at a predetermined probability, for example, at a probability of 30%. In this effect, an image of the scene wherein a plurality of animation characters are walking in line is displayed in the video reel display region.

The conditions on payment announcement 1 (small WIN or more established effect), payment announcement 2 (middle WIN or more established effect), and payment announcement 3 (big WIN or more established effect) may sometimes be met with at least a part of them overlapped. In such an overlapped case, an effect is determined in sequential order of payment announcement 3>payment announcement 2>payment announcement 1. That is, an effect is determined so that payment announcement 3 has the highest priority and payment announcement 1 has the lowest priority.

<<Interrelationship Between Types of Effects and the Progress of Game>>

Figure 25:
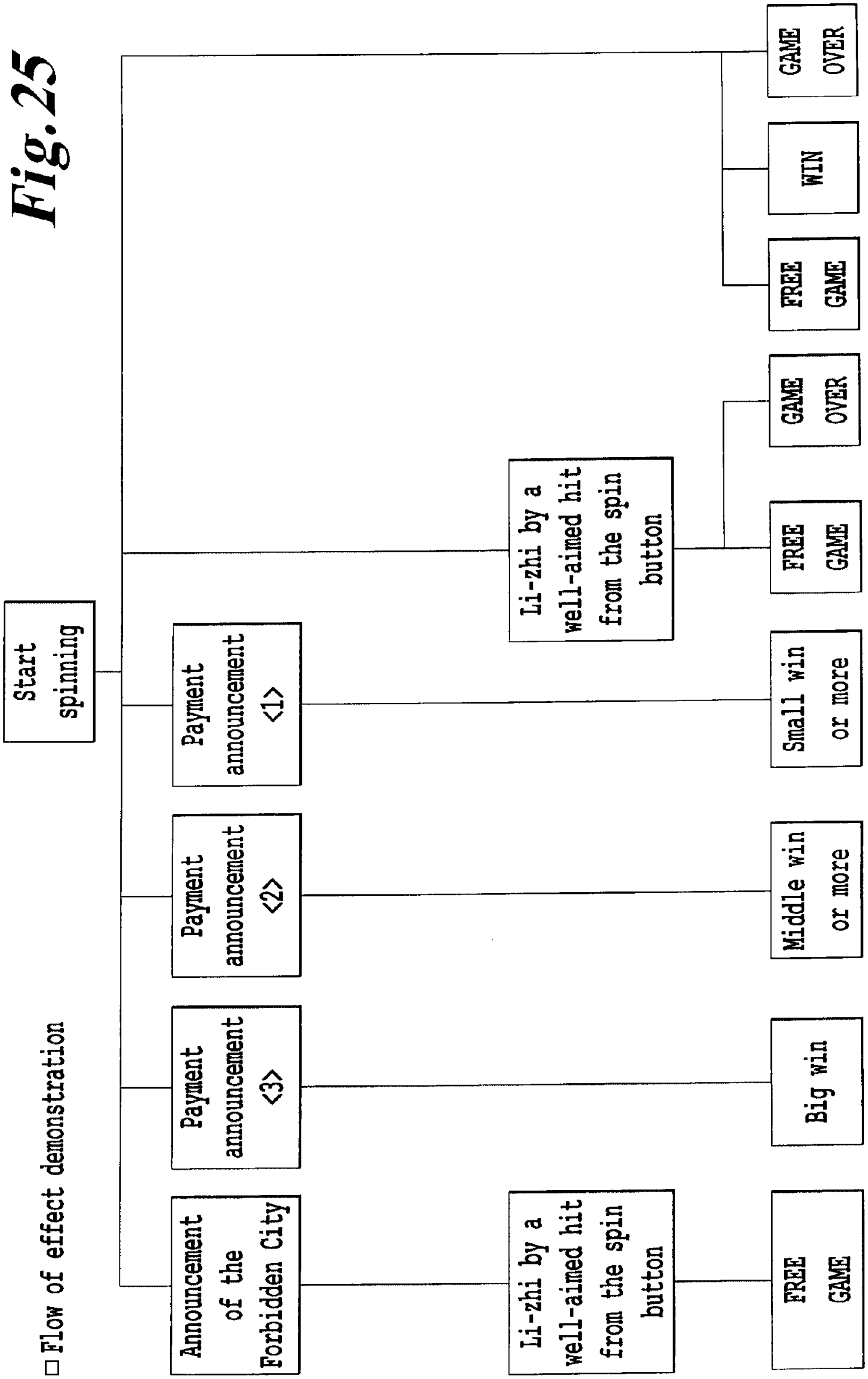
FIG. 25 is a view showing an interrelationship between types of effects and the progress of a game, for the gaming machine according to the embodiment of the present invention.

FIG. 25 shows an interrelationship between the abovementioned types of effects and the progress of game.

First of all, when an effect of announcement of the Forbidden City is produced after spinning has been started (scroll-display has been started), this effect extends to an effect of li-zhi by a well-aimed hit from the spin button and a free fame is started as a bonus game. When an effect of payment announcement 3 is produced after spinning has been started, a big win is then established in the game. When an effect of payment announcement 2 is produced after spinning has been started, a middle win or more is then established in the game. When an effect of payment announcement 1 is produced after spinning has been started, a small win or more is established in the game.

Further, in the case where an effect of li-zhi by a well-aimed hit from the spin button is directly produced after spinning has been started, when a well-aimed hit from the spin button operation is successful, a free game is started as a bonus game. On the other hand, when a well-aimed hit from the spin button operation fails, "game over" is established. When none of the abovementioned effects is produced, in one case, a free game is started as a bonus game; in another case, a predetermined number of coins according to a result of symbol lottery processing are paid out; and in the other case, "game over" is established.

<<Outline of Free Game>>

An outline of the abovementioned free game will be described below.

When symbols are rearranged after video reels have been stopped, a free game is started in the case where three trigger symbols are stop-displayed. This case is not dependent upon selected BET or LINE.

<Free Game Winning Effect>

Figure 26A:
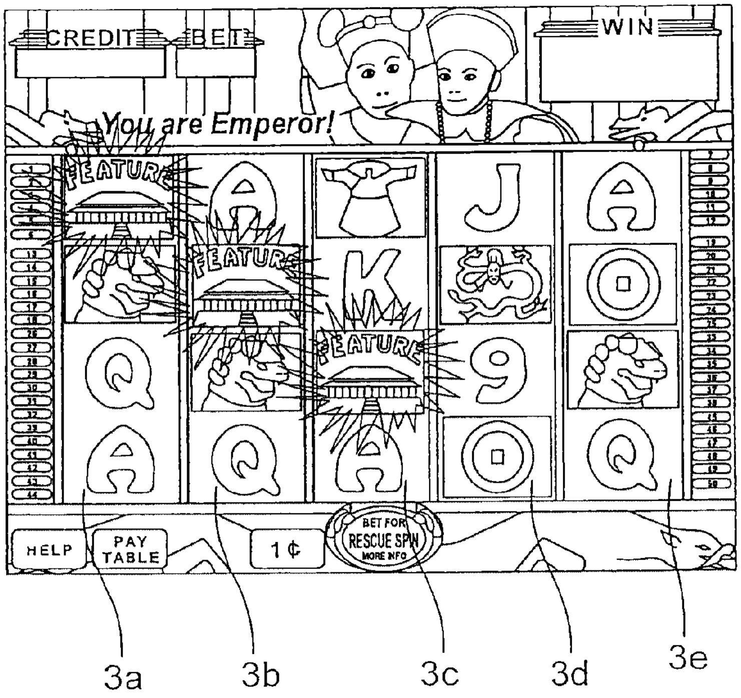
FIGS. 26A and 26B show images respectively displayed when a free game winning effect for the gaming machine according to the embodiment of the present invention has been executed.

When the free game has been started, in the case of meeting an appropriate condition for producing a free game winning effect, the free game winning effect is started. The above appropriate condition is that a fifth video reel 3*e* stops on the first screen after three scatter symbols have been stopped (see FIG. 26A). Next, WIN occurrence symbols including trigger symbols are animation-displayed. However, no symbols are moved for three seconds after the appearance of FEATURE. The routine migrates to the lottery screen when increment end or increment skip is established. The screen clearing condition is that increment end or increment skip is established.

Figure 26B:
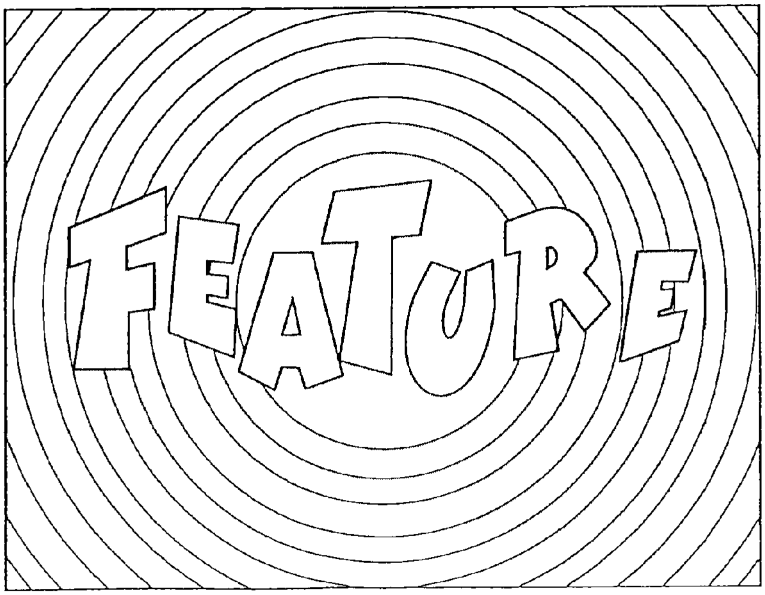

The second screen allows an effect of "FEATURE" to be displayed and a common sound to be reproduced (see FIG. 26B). Further, the routine migrates to a FEATURE explanation screen when increment end or increment skip is established. The screen clearing condition is also that increment end or increment skip is established.

<WILD Increasing Effect>

A WILD increasing effect is established when a START FEATURE button has been depressed on a waiting screen or after elapse of two minutes (other than NSW).

At this time, on the first effect screen, an effect is produced in such a manner that the number of WILD symbols and a fixed number of SCATTER symbols are increased. All of the effects of SCATTER are in the same manner as those of WILD symbols. First, the fixed SCATTER symbols are increased in number, and to what extent that WILD symbols increase in number is shown by way of effect.

First of all, each of the video reels initially displays symbols in an arrangement when FEATURE IN is established. Next, the video reels are scroll-displayed; upper two and lower two of the positions at which WILD symbols increase in number are allowed to be displayed on the video reels; and at the displayed positions, an increasing-effect director starts to be fed. Further, the increasing-effect director uses the corresponding data in conjunction with the increased number of WILD symbols. For example, 1 to 6 items of the data are prepared. Next, WILD symbols are set at their specified positions in back where the increasing-effect director is fed (see FIG. 28). The numbers of the upper part corresponding to the WILD symbols are allowed to be counted up every time a WILD symbol is added. In general, all of RS, MAX, and BET symbols are added without being cleared.

By increasing WILD symbols as described above, the WILD symbols can be arranged as in FIG. 27 on each of the five video reels. FIG. 27 is a conceptual diagram showing additions or arrays of software-processed symbols, and it should be noted that these symbol layouts are not hardware-stored as such symbol arrays.

<Angel Effect>

An angel effect is produced when a winning prize is given after execution of lottery processing. The lottery processing determines whether or not an angel effect is produced when a free game has started and in what number game the angel effect is produced if produced. The winning probability is 60%. The angel effect does not appear twice while in one free game. If the angel effect is produced, at the start of a game, a goddess appears and two WILD symbols are added to each of the second to fifth video reels 3*b*, 3*c*, 3*d*, and 3*e*, instead of adding one in a usual case (see FIG. 29A).

<Processing while in a Free Game>

Figure 29B:
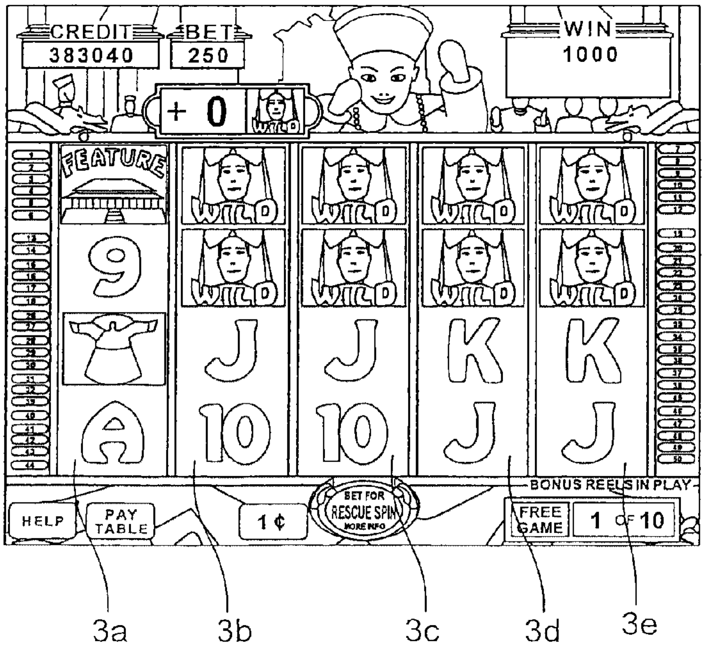

Video reels are changed to reel bands for a free game (see FIG. 29B). At this time an effect of increasing video reels is produced on the screen. A specific number of games are automatically played without any operation of a player.

The number of remaining free games is displayed on a counter at the lower right of the screen, and a voice is generated at the time that one count is increased. In the "current number of free game" field, a counted value to be added by 1 is displayed at the same time as video reel scrolling is started. The maximum value is "999." Further, In the "total number of free games played" field, a total number of free games played so far is displayed. The maximum value is also "999."

<Retrigger Processing>

A free game is added in the case where the following condition is met. The condition is that three trigger symbols are stopped while in a free game. This condition is not dependent upon the selected BET or LINE.

Figure 30A:
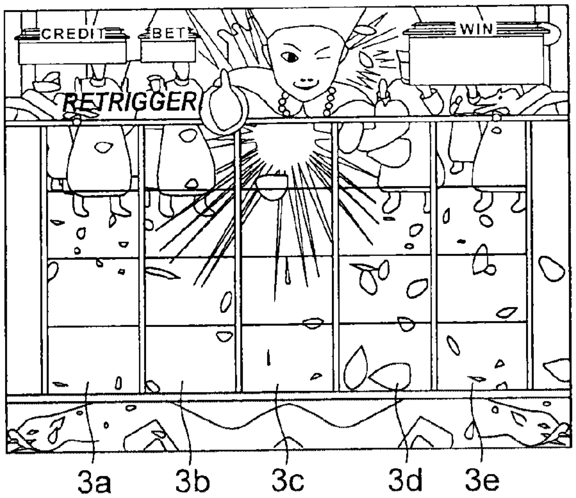
FIGS. 30A, 30B, and 30C show images respectively displayed when the gaming machine according to the embodiment of the present invention executes retrigger processing for the gaming machine according to the embodiment of the present invention has been executed.
Figure 30B:
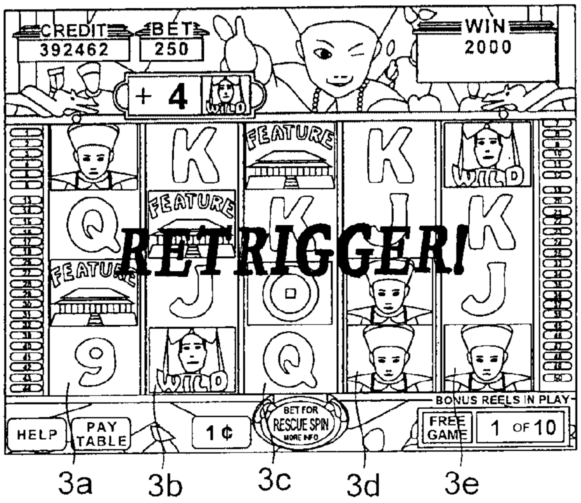
Figure 30C:
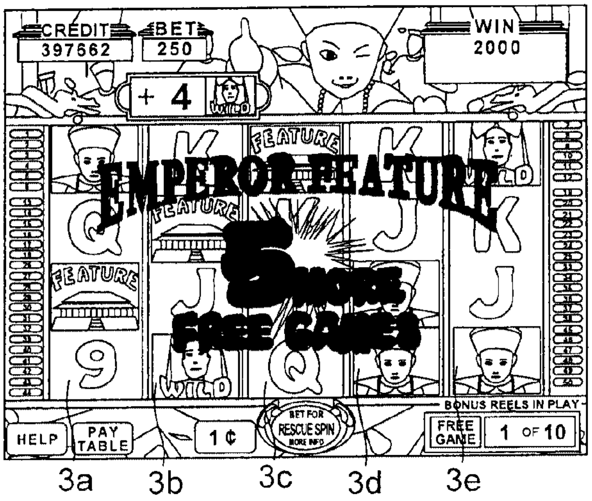

In this case, the screen is displayed in sequential order of FIGS. 30A, 30B, and 30C. In FIG. 30A, an animation character of the upper part shows a thumb, and a screen of spreading light is displayed in the video reel display region. Next, in FIG. 30B, the video reel display region is displayed darkly, and a character string "RETRIGGER!" is displayed. Further, in FIG. 30C, a character string "EMPEROR FEATURE" is displayed at the upper stage, and a character string "5 MORE FREE GAMES" is displayed at the lower stage.

In this retrigger processing, a type of a free game is determined, and data on a FEATURE name of the pertinent content is used. A retrigger effect is automatically produced, and 5 games are added. Any further WILD symbol lottery processing is not performed. The retrigger is executed only one time. At the second time or subsequent, payout is performed for only WIN. A condition for eliminating this processing is that a TART FEATURE button has been depressed.

In the case where the total number of free games played exceeds "999" as a result of the occurrence of the retrigger, the number exceeding 999 is not counted, and any further count-up processing is not performed. Although the number of free games played is not counted, the payment provided by the appearance of trigger symbols is counted, and is added to TOTAL WIN.

<Free Game Ending Condition>

A free game is completed in the case where a predetermined total number of free games have been played or in the case where a 999-th free game has been completed.

What is claimed is:

1. A gaming machine comprising:

a symbol display device that includes a plurality of video reels and is capable of variably displaying a symbol array having a plurality of symbols displayed on each of the video reels; and a controller configured to:

(A) execute a basic game in which gaming media are betted, the plurality of symbols being stop-displayed after variably displayed in the symbol display device, and then gaming media whose amount corresponds to the stop-displayed symbols or a combination thereof being paid out, (B) execute a free game in which no gaming media are betted, the plurality of symbols being stop-displayed after variably displayed in the symbol display device, and then, gaming media whose amount corresponds to the stop-displayed symbols or a combination thereof being paid out; and (C) add a plurality of WILD symbols into the symbol array of each of the plurality of video reels except for one video reel during the free game, each of the wild symbols being capable of forming a winning combination in an almighty manner, wherein a number of added WILD symbols in each of the plurality of video reels during the free game is greater than a number of symbols, in each of the plurality of video reels, that are stop-displayed on the symbol display device.

2. The gaming machine according to claim 1, wherein, the processing (A) comprises processing of:

(A-1) setting the free game consisting of a plurality of games when a bonus game trigger is established in the basic game, and the plurality of WILD symbols are added in a middle of the free game after the free game starts.

3. A gaming machine comprising:

a symbol display device that includes a plurality of video reels and is capable of variably displaying a symbol array having a plurality of symbols displayed on each of the video reels; and a controller configured to:

(A) execute a basic game in which gaming media are betted, the plurality of symbols being stop-displayed after variably displayed in the symbol display device, and then gaming media whose amount corresponds to the stop-displayed symbols or a combination thereof being paid out, (B) execute a free game in which no gaming media are betted, the plurality of symbols being stop-displayed after variably displayed in the symbol display device, and then, gaming media whose amount corresponds to the stop-displayed symbols or a combination thereof being paid out, (C) add a plurality of WILD symbols into the symbol array of each of the plurality of video reels except for one video reel during the free game, each of the wild symbols being capable of forming a winning combination in an almighty manner, and (D) control the symbol display device to display a video image overlapping the one video reel that includes no additional WILD symbols.

* * * * *